(12) United States Patent
Antar et al.

(10) Patent No.: US 12,056,227 B2
(45) Date of Patent: *Aug. 6, 2024

(54) SYSTEMS AND METHODS FOR DEVICE AND USER AUTHORIZATION

(71) Applicant: Comcast Cable Communications, LLC, Philadelphia, PA (US)

(72) Inventors: Andrew Antar, Penn Valley, PA (US); Asad Haque, Chesterbrook, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,626

(22) Filed: May 22, 2023

(65) Prior Publication Data
US 2023/0376584 A1     Nov. 23, 2023

Related U.S. Application Data

(63) Continuation of application No. 17/302,534, filed on May 5, 2021, now Pat. No. 11,698,958, which is a
(Continued)

(51) Int. Cl.
*H04L 9/40* (2022.01)
*G06F 16/182* (2019.01)
(Continued)

(52) U.S. Cl.
CPC .......... *G06F 21/44* (2013.01); *G06F 16/1824* (2019.01); *H04L 9/0643* (2013.01);
(Continued)

(58) Field of Classification Search
CPC ...... H04L 9/50; H04L 63/0823; H04L 63/102
See application file for complete search history.

(56) References Cited

U.S. PATENT DOCUMENTS 11,030,297 B2    6/2021  Antar et al.
11,698,958 B2 *  7/2023  Antar .................. H04L 63/102
                                                    726/2
(Continued)

OTHER PUBLICATIONS

US Patent Application filed on May 5, 2021, entitled "Systems and Methods for Device and User Authorization", U.S. Appl. No. 17/302,534.

*Primary Examiner* — David J Pearson
(74) *Attorney, Agent, or Firm* — BakerHostetler

(57) ABSTRACT

Systems and methods are described for authorizing users and/or devices. An example method may comprise receiving, from a user device, a request to access a function associated with a service account. The request may comprise an identifier of the user device. The example method may comprise determining, based on the identifier, a primary authority holder of the service account. The example method may comprise determining that a first record on a first distributed ledger associated with the primary authority holder indicates that the user device is associated with the primary authority holder. The example method may comprise determining that a second record on a second distributed ledger associated with the user device indicates that the user device is associated with the primary authority holder. The example method may comprise granting, based on the request, the first record, and the second record, the user device access to the function.

28 Claims, 18 Drawing Sheets

Related U.S. Application Data continuation of application No. 16/240,526, filed on Jan. 4, 2019, now Pat. No. 11,030,297.

(51) Int. Cl.
  *G06F 21/44* (2013.01)
  *H04L 9/06* (2006.01)
  *H04L 9/08* (2006.01)
  *H04L 9/32* (2006.01)
  *H04L 9/00* (2022.01)

(52) U.S. Cl.
  CPC .......... *H04L 9/0861* (2013.01); *H04L 9/3247* (2013.01); *H04L 63/0823* (2013.01); *H04L 63/102* (2013.01); *H04L 9/50* (2022.05)

(56) References Cited

U.S. PATENT DOCUMENTS

| | | |
|---|---|---|
| 2017/0011460 A1 | 1/2017 | Molinari et al. |
| 2017/0331896 A1 | 11/2017 | Holloway et al. |
| 2018/0343126 A1 | 11/2018 | Fallah et al. |
| 2019/0364046 A1 | 11/2019 | Kurian et al. |
| 2020/0213305 A1 | 7/2020 | Obaidi et al. |

\* cited by examiner

Receive a request to access a function associated with a service account from a user device
1710

Determine a primary account holder of the service account
1720

Determine that a first record on a first distributed ledger associated with the primary account holder indicates that the user device is associated with the primary account holder
1730

Determine that a second record on a second distributed ledger associated with the user device indicates that the user device is associated with the primary account holder
1740

Grant the user device access to the function
1750

FIG. 17

SYSTEMS AND METHODS FOR DEVICE AND USER AUTHORIZATION

CROSS REFERENCE TO RELATED APPLICATIONS

This application is a continuation of U.S. patent application Ser. No. 17/302,534, filed May 5, 2021, which is a continuation of U.S. patent application Ser. No. 16/240,526, filed Jan. 4, 2019, now U.S. Pat. No. 11,030,297, issued Jun. 8, 2021, which are hereby incorporated by reference in their entirety.

BACKGROUND

A service provider may provide a platform to one or more account holders. The one or more account holders may access the platform via one or more user devices. The service provider may restrict access to the platform by requiring that account holders be authorized using a password. However, if a password is compromised, then it may be possible for an unauthorized user to access the platform.

SUMMARY

A request to access a function associated with a service account may be received from a user device. The request may comprise an identifier of the user device. A primary authority holder of the service account may be determined, such as based on the identifier. A first record on a first distributed ledger associated with the primary authority holder may be determined that indicates that the user device is associated with the primary authority holder. A second record on a second distributed ledger associated with the user device may be determined that indicates that the user device is associated with the primary authority holder. The user device may be granted access to the function based on the request, the first record, and/or the second record.

BRIEF DESCRIPTION OF THE DRAWINGS

The following drawings show generally, by way of example, but not by way of limitation, various examples. In the drawings:
FIG. 17 shows an example method.

DETAILED DESCRIPTION

Figure 1:
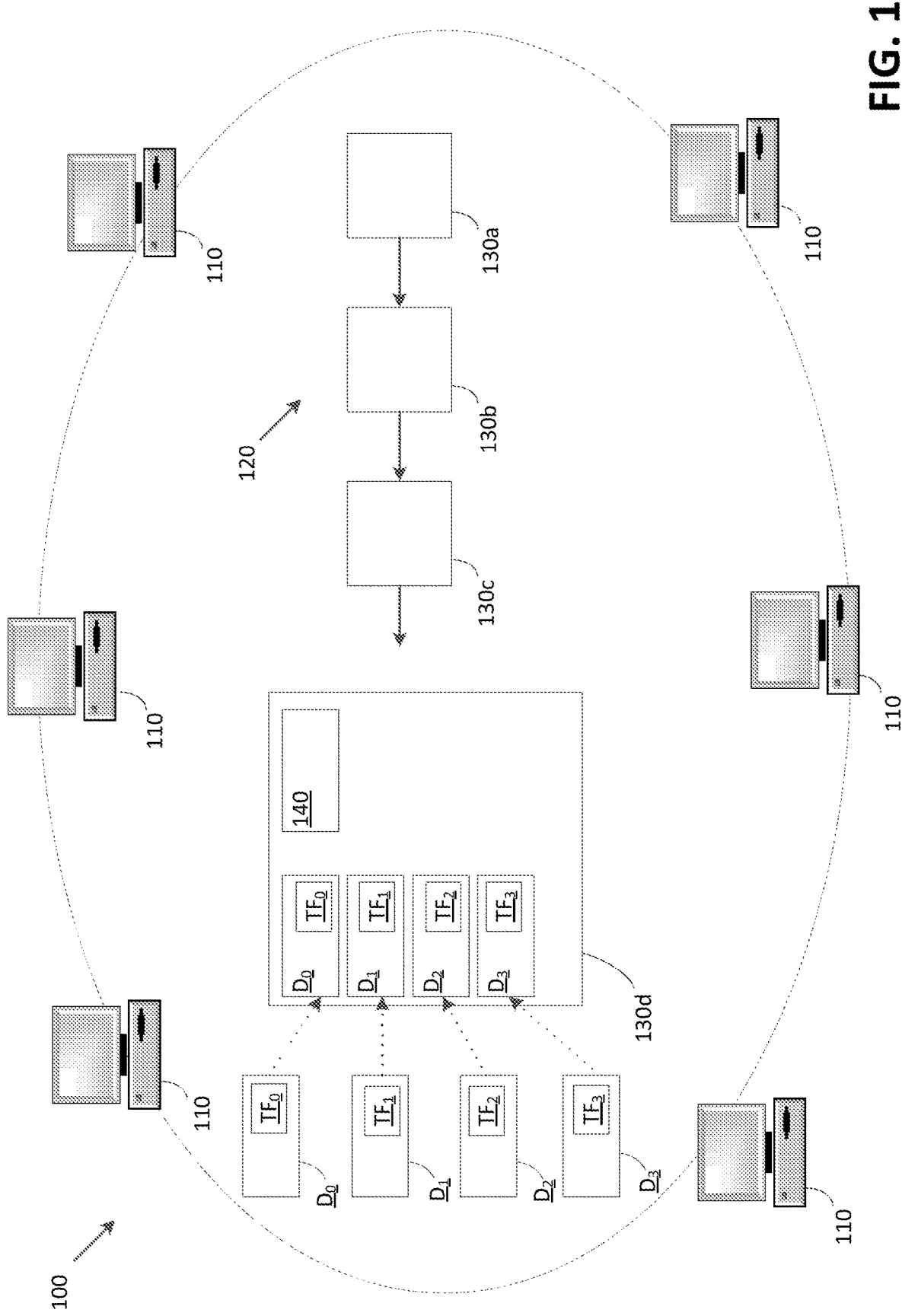
FIG. 1 shows an example distributed system.

A primary authority holder may manage permissions associated with an account for users and/or devices. Based on the primary authority holder allowing a new device (e.g., smart device, set-top box, peripheral device, etc.) access to the platform via the account, a new private distributed ledger, such as a blockchain, associated with the new device may be generated. A record indicating the new device may be stored and/or created on a distributed ledger associated with the primary authority holder. The generation of the new private distributed ledger and/or the storing the record indicating the new device on the distributed ledger associated with the primary authority holder may enable a secondary authority holder to be securely added to the account and authorized for to access settings, features, and/or services associated with the account.

Each private distributed ledger may comprise a genesis block. The genesis block may comprise an identifier that refers to an associated device. Each private distributed ledger may comprise records (e.g., blocks, transactions, etc.), wherein the records comprise device association or access grants. The access grant may comprise an identifier associated with an authorized user, an identifier associated with an authorized device, a level of access, an access expiration time and/or date, etc. The access information may indicate a level of visibility for a particular device (e.g., which devices attached to a particular account may the particular device see and what information about the devices may the particular device see, etc.) Based on receiving a request for permission to access the platform from a device, a private distributed ledger associated with the device may be examined. Based on a record in the examined private distributed ledger indicating that the device comprises permission for the requested access, the permission may be granted.

A device and/or a user may be authorized for a service provider's platform, such as by authenticating and verifying the device and/or the user and/or permitting the device and/or the user to access settings, features, and/or services associated with an account. Based on a user initially logging-into the platform (e.g., logging into the platform via an application on a mobile device, etc.), a private distributed ledger may be generated for the user and a token may be generated for an account associated with the user. The user may comprise a primary authority holder. The primary authority holder may comprise a primary account holder. The user may have administrative rights (e.g., rights to grant rights and/or permissions to other users, etc.). The private distributed ledger may comprise an original record (e.g., a genesis block). The original record may comprise encrypted or hashed metadata, such as an account number associated with the account.

The user may add a device to the account using the platform. The user may enter the device to add via a user interface. A transaction may be stored and/or created in a record in the private distributed ledger based on the user adding the device. The transaction may comprise an identifier associated with the device. The transaction may comprise an indication that the user comprises administrative rights. The identifier associated with the device may comprise a hash of a device public key associated with the device. The identifier may comprise a token. The token may comprise a token generated for the device, such as based on logging into the platform on the mobile device. The identifier may be stored as and/or in a digital certificate on the device. Based on the user requesting permission to access the platform, the distributed ledger may be examined. The user may be granted administrative rights based on the transaction stored and/or created on the distributed ledger.

The user may grant administrative rights and/or permissions (e.g., access to one or more of the devices associated with the account, etc.) to another user via the platform. The granted administrative rights and/or permissions may be limited by time and/or function. In response to the user granting administrative rights and/or permissions to the other user (and/or based on the other user logging into the platform), a series of steps may be initiated. The series of steps may comprise generating an account for the other user. The series of steps may comprise generating a token for the account of the other user. The series of steps may comprise storing a record on the distributed ledger indicating the other user.

The series of steps may comprise storing (e.g., posting, etc.) a transaction on the private distributed ledger associated with the original user. The transaction in the private distributed ledger associated with the original user may comprise a hash of an identifier associated with the other device or user, wherein the identifier is stored as and/or in a digital certificate on the other device. Based on the user granting the other user administrative rights, a transaction that comprises hash of the identifier of the other account holder's device may be stored and/or created on the private distributed ledger associated with the primary user. A transaction may be stored and/or created on the private distributed ledger associated with primary authority holder, wherein the transaction comprises information associated with the other device. The information associated with the other device may comprise an identifier of the user, an identifier of the device, and/or an indication of the rights/permissions.

If the other user has administrative rights, then the other user may grant a third user rights and/or permissions to one or more devices. If the other user has administrative rights and the other user grants administrative rights and/or permissions to the third user, then the series of steps may repeat for the third user. Examples of permissioned device functions and/or actions may comprise device replacement (warranty), accessing data stored on a device, making purchases with saved payments, submitting a claim for a device, switching plans (e.g., data plan, payment plan, protection plan, etc.), changing a service address (having new device sent to new address), the like, and/or any combination of the foregoing.

Based on a user attempting to access functions and/or services on a device with rights and/or permissions, a digital certificate may be received from the device. The identifier may be obtained from the digital certificate. One or more appropriate distributed ledgers may be searched to determine that a transaction indicates that a device associated with the obtained identifier has been granted appropriate rights and/or permissions for the attempted functions and/or services. If a transaction indicating that the device associated with the obtained device number has been granted appropriate rights and/or permissions for the attempted functions and/or services is found, then the device may be verified. Based on verifying the device, the device may be allowed to access the functions and/or services.

The multiple distributed ledgers, distributed ledger records, and/or the platform may form a secure system for adding permissioned users (e.g., another primary user, a secondary authority holder, a tertiary user, etc.) to the account. For example, the multiple distributed ledgers may provide layers of security to guard against fraudulent access to settings, features, and/or services associated with the account, such as by an unauthorized user. A distributed ledger associated with a non-primary user may be used to verify and/or authenticate the non-primary user, such as in conjunction with a digital certificate. The distributed ledger associated with the user (e.g., the primary user) that added the non-primary user may be used to determine that the verified non-primary user is authorized to access a setting, feature, and/or service associated with the account.

The multiple distributed ledgers, distributed ledger records, and/or the platform may form a scalable system for adding permissioned users to the account. The platform may enable a primary user to conveniently add permissioned users to the account, such as in a batch. The multiple distributed ledgers may enable non-primary users to add other users to the account, such as by adding a record indicating a new user and generating a new distributed ledger for the new user.

FIG. 1 shows an example distributed system. The distributed system may comprise a network 100 of nodes 110. A node 110 may comprise a computing device, a central processing unit, a graphical processing unit, a field programmable gate array, or an application specific integrated circuit. A node 110 may comprise a cable modem, set-top box, lap top, smart phone, tablet, a portable digital assistant, a smart television, wearable computing device, mobile computing device, an Internet of Things ("IoT") device, or any device with computing capabilities or network connectivity capabilities. The nodes may be associated with a common entity, such as a provider of a service.

The network 100 of nodes 110 may comprise a decentralized database. The decentralized database may not have a central administrator or centralized storage. Each node 110 in the network 100 may store a copy of a collection of data, such as a distributed database. A distributed database may comprise recorded entries, such as transactions. The data may be replicated, shared, or synchronized across the nodes 110. The decentralized database may be continually reconciled, such as to reflect changes to the collection of data. The nodes 110 may continually or periodically download the most recent version of the collection of data. Based on a node 110 joining the network 100, the node 110 may automatically download the collection of data.

A decentralized database, such as a distributed database, may comprise a blockchain 120. The decentralized database, such as the distributed database, may comprise a blockchain database and/or utilize blockchain data management techniques. A blockchain 120 may comprise one or more blocks 130 in which data is recorded. The blocks 130 in the blockchain 120 may function as a mechanism to organize the data in the blockchain 120. The blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network 100 may build the blockchain 120, such as by adding blocks 130 to the blockchain 120. The nodes 110 may perform several operations to build the blockchain 120. Based on receiving new data $D_0$, $D_1$, $D_2$, $D_3$ by the network 100, the nodes 110 may validate the new data $D_0$, $D_1$, $D_2$, $D_3$. If the new data $D_0$, $D_1$, $D_2$, $D_3$ comprises transactions, the nodes 110 may validate, verify, or authenticate the identity of the parties to the transaction. The one or more transactions will be discussed in more detail in reference to FIG. 5 below. A transaction may comprise a public key of a party to the transaction and a digital signature of the party to the transaction. The digital signature may comprise the hash of transaction data, such as with a cryptographic hash function. The digital signature may comprise a hash of transaction data encrypted with a private key corresponding to the public key. Examples of hash functions include, RipeMD160, SHA-256, SHA-512, and SHA-3. The digital signature may be validated by the nodes 110, such as by decrypting the digital signature with the public key. The digital signature may allow for verification of the transaction and maintenance of the anonymity of the parties to the transaction.

The nodes 110 may collate the new data $D_0$, $D_1$, $D_2$, $D_3$ into a new block 130d. The nodes 110 may record one data record $D_0$ in a new block 130d. The nodes 110 may perform an operation to add the new block 130d to the blockchain 120. If the data in the blocks 130 is related chronologically, such as where the first block 130a in the chain records older data than the data of subsequent blocks 130b, 130c, the nodes 110 may perform a timestamp function to log the sequence in which blocks 130 are stored and/or created on the blockchain 120. The nodes 110 may append a hash of the previous block 130c to the new block 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the blockchain 120.

The nodes 110 may be incentivized to perform the operation to add a new block 130d to the blockchain 120. A block 130d may be assigned a value 140, such as a coin or unit of digital currency that will be transferred to one or more nodes 110 that perform part or all of the operation. The value 140 may depend on the difficulty of performing the operation for the block 130d. Also, if the data $D_0$, $D_1$, $D_2$, $D_3$ recorded in a block 130d comprises transactions, a transaction may assign a transaction fee $TF_0$, $TF_1$, $TF_2$, $TF_3$ which may be transferred to one or more nodes 110 that perform the operation on the block 130d in which the transaction is recorded. If an incentive is provided for nodes 110 to perform the operation to add the new block 130d to the blockchain 120, performance of the operation may be referred to as mining.

The nodes 110 may individually perform an operation to build the blockchain 120. The nodes 110 may lend or combine their processing power, such as in a pool, to perform an operation to build the blockchain 120. If the nodes 110 work in tandem, incentives, such as the value 140, may be divided amongst the nodes 110. Incentives may be divided proportionally to contribution of the nodes 110 to the work. The nodes 110 may also invoke a network miner service to build the blockchain 120, such as by creating a block in the blockchain 120. The nodes 110 may download the blockchain 120 updated by the network miner service.

If the nodes 110 are associated with a common entity, the nodes 110 may have trust. One or more of the nodes 110 may communicate a transaction to be added to the blockchain 120 and the nodes 110 may add the transaction to the blockchain. One or more nodes 110 may communicate a most recent version of the blockchain 120 to the nodes 110.

Once the operation is performed to add a new block 130d to the blockchain 120, the nodes 110 may communicate the new block 130d to the network 100. The nodes 110 may express their acceptance of the new block 130d to the blockchain 120 by working off the block 130d to add a subsequent block to the blockchain 120. If more than one version of the blockchain 120 exists, the nodes 110 may attempt to work off the longest blockchain 120. The longest blockchain 120 may be determined by an algorithm for scoring the blockchain 120. A blockchain 120 may be assigned a score based on the computational work required to generate the blockchain 120. A node 110 may communicate the longest blockchain 120 that the node 110 has observed to the network 100, such as with a gossip protocol.

The network 100 may have self-correcting mechanisms, such as to address discrepancies between nodes 110 in the network 100. If there is a fork in a blockchain 120, a node 110 working off one branch of the blockchain 120 may switch to a second branch of the blockchain 120, if the second branch becomes longer than the first branch. Based on a node 110 not receiving a block 130b, the node 110 may request the block 130b based on receiving the next block 130c and determining that the node 110 did not receive the previous block 130b.

One or more nodes 110 in the network 100 may not participate in building the blockchain 120. The operations that the nodes 110 in the network 100 may perform relating to the blockchain may not be limited to building the blockchain 120. One or more nodes 110 may monitor the blockchain 120 for particular transactions. The nodes 110 may monitor the blockchain 120 for transactions that comprise an identifier associated with a party.

Figure 2:
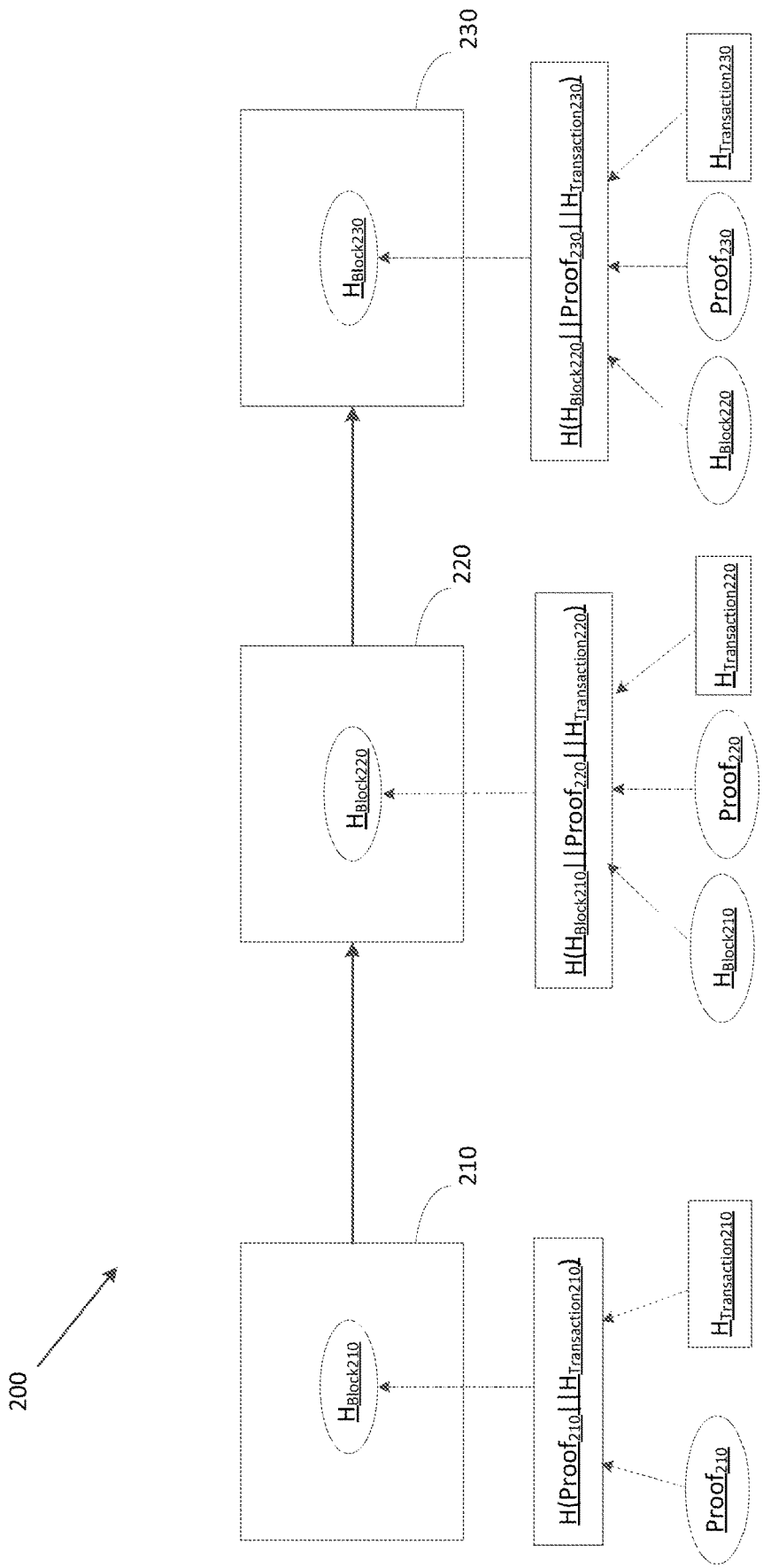
FIG. 2 shows an example distributed ledger.

FIG. 2 shows an example distributed database architecture. A distributed database may comprise a blockchain 200 in which one or more transactions are recorded in blocks 210, 220, 230. The one or more transactions will be discussed in more detail in reference to FIG. 5 below. The distributed database may comprise a blockchain database and/or utilize blockchain data management techniques. The blocks 210, 220, 230 may be linked in a sequence that represents the chronology of the execution, validation, or recording of the transactions. The blockchain 200 may comprise a genesis block 210 that records the earliest transaction in the blockchain 200 and comprises the first block 210 in the blockchain 200.

Each block 220, 230 following the genesis block 210 may record a transaction that was executed or validated subsequent to the transaction of the preceding block 210, 220, 230 in the blockchain 200. Each block 210, 220, 230 may record a transaction that occurred prior to the transaction of the subsequent block in the blockchain 200. The block 230 may record a transaction that occurred after the transaction recorded in the block 220. A new transaction may be recorded in a new block. The new block may be appended to the last block 230 in the blockchain 200. Although the example blockchain 200 is shown comprising three blocks 210, 220, 230, the blockchain 200 may comprise less than three blocks or more than three blocks. The blocks 210, 220, 230 may record transactions as hashes of the transactions.

Figure 3:
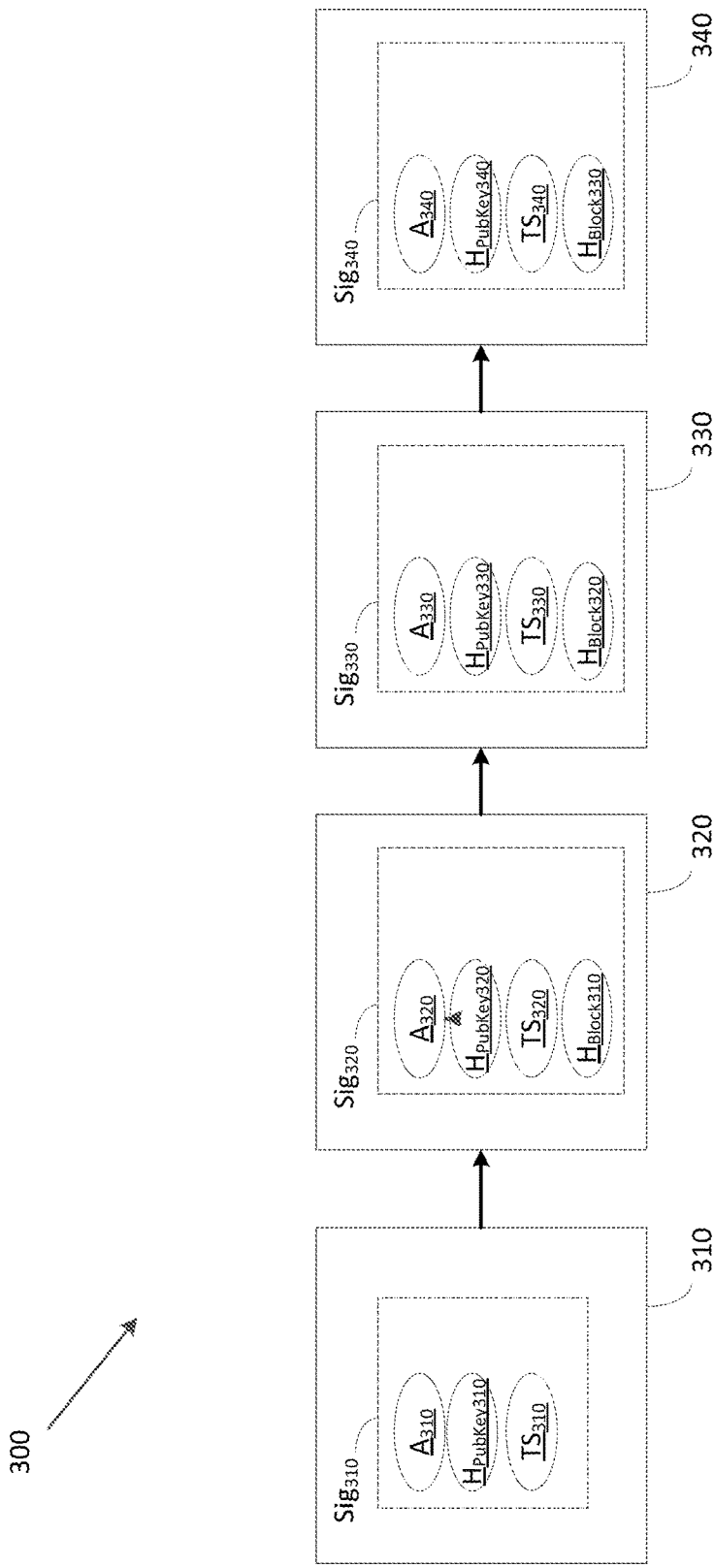
FIG. 3 shows an example distributed ledger.

FIG. 3 shows an example system for managing device association. The system may comprise a distributed database 300. The distributed database may comprise a blockchain. The distributed database 300 may comprise a register of devices. The distributed database 300 may comprise a register of associated devices. Associated devices may comprise devices associated with a common entity such as a user, a household, or a service provider. The devices may comprise computing devices, electronic devices, mobile devices, or Internet of Things (IoT) devices. An IoT device may comprise a device embedded with electronics, such as a circuitry part, a sensor, a camera, an audio input or output, or a lighting unit. An IoT device may have computing capabilities. An IoT device may have network connectivity capabilities. An IoT device may have capabilities (e.g., or may be configured) to collect and exchange data. An IoT device may comprise a personal computer, a mobile phone, a household appliance, a wearable, a gateway device, a health appliance, a premises management system component, a content device, a display, and a vehicle.

The distributed database 300 may be associated with an entity, such as a user, a household, or a service provider. The uniqueness of the distributed database 300 to the entity may disincentivize targeting of the distributed database 300, such as for tampering or breaching. Comprising device data associated with the entity, the distributed database 300 may not comprise a honeypot of data for an unauthorized user to access. A party attempting to tamper with a database to acquire private data, may at best only obtain cryptographic hashed data from the distributed database 300. The data obtained from the distributed database 300 may be difficult to reverse to text form.

The distributed database 300 may be anonymous. The distributed database 300 may not comprise data identifying the associated entity. The distributed database 300 may not comprise unsecured data identifying the associated entity. The distributed database 300 may comprise data identifying the associated entity in a secure or encrypted form. The data identifying the associated entity in the secure form may be opaque to users or devices examining the distributed database 300. The distributed database 300 may not require a user to divulge ownership information, such as to a central authority or backend authentication system. The distributed database 300 may achieve security through obscurity. The anonymity of the distributed database 300 may deter unauthorized tampering with the distributed database 300. A party wishing to access a device or data of the entity may not be able to identify the distributed database 300 as being associated with the entity.

The distributed database 300 may comprise as a mechanism for a device to vet the identity of another device. Vetting the identity of the other device may comprise validating, verifying, or authenticating the identity of the other device. The device may use the distributed database 300 to confirm association with the other device. The device may access the distributed database 300 to determine whether to respond to a communication from the other device. The device may access the distributed database 300 to determine whether to grant the other device access to the device or to a proxied device.

The distributed database 300 may comprise a plurality of blocks 310, 320, 330, 340. Each block 310, 320, 330, 340 may comprise a distributed database record. The distributed database record may comprise data associated with a device, such as data identifying the device. Each block 310, 320, 330, 340 may comprise a hash of a key ($H_{PubKey310}$, $H_{PubKey320}$, $H_{PubKey330}$, $H_{PubKey340}$) of the device. The key may comprise a public key of the device. The public key may be unique to the device. The public key may be paired with a private key of the device. Each block 310, 320, 330, 340 may comprise an address of the device ($A_{310}$, $A_{320}$, $A_{330}$, $A_{340}$). The address may comprise a hash of the key ($H_{PubKey310}$, $H_{PubKey320}$, $H_{PubKey330}$, $H_{PubKey340}$) of the device, such as the public key of the device.

Each block 310, 320, 330, 340 may comprise a timestamp ($TS_{310}$, $TS_{320}$, $TS_{330}$, $TS_{340}$). The timestamp ($TS_{310}$, $TS_{320}$, $TS_{330}$, $TS_{340}$) may indicate when the block 310, 320, 330, 340 was generated. The inclusion of the timestamps ($TS_{310}$, $TS_{320}$, $TS_{330}$, $TS_{340}$) may link the blocks 310, 320, 330, 340. Each block generated after a genesis block 320, 330, 340 may comprise a hash of the previous block ($H_{Block310}$, $H_{Block320}$, $H_{Block330}$) in the distributed database 300. The inclusion of the hash of the previous block ($H_{Block310}$, $H_{Block320}$, $H_{Block330}$) in the distributed database 300 may link the blocks 310, 320, 330, 340. The inclusion of the hash of the previous blocks ($H_{Block310}$, $H_{Block320}$, $H_{Block330}$) in the distributed database 300 may comprise an iterative chain of hash functions. The linking of the blocks 310, 320, 330, 340 may deter unauthorized tampering or breaching of the distributed database 300. Tampering with a block 310, such as retroactively modifying the block 310, may require modification of the subsequent blocks 320, 330, 340. The computing power or labor to tamper or breach the distributed database 300 may deter targeting of the distributed database 300 by an unauthorized entity.

Each block 310, 320, 330, 340 may comprise a signature ($Sig_{310}$, $Sig_{320}$, $Sig_{330}$, $Sig_{340}$). The signature ($Sig_{310}$, $Sig_{320}$, $Sig_{330}$, $Sig_{340}$) may comprise an encryption with a key of the device, such as the private key of the device. The signature ($Sig_{310}$, $Sig_{320}$, $Sig_{330}$, $Sig_{340}$) may comprise an encryption of one or more of the address of the device ($A_{310}$, $A_{320}$, $A_{330}$, $A_{340}$), the hash of the key ($H_{PubKey310}$, $H_{PubKey320}$, $H_{PubKey330}$, $H_{PubKey340}$), the timestamp ($TS_{310}$, $TS_{320}$, $TS_{330}$, $TS_{340}$) and the hash of the previous block ($H_{Block310}$, $H_{Block320}$, $H_{Block330}$). The signature ($Sig_{310}$, $Sig_{320}$, $Sig_{330}$, $Sig_{340}$) may deter unauthorized tampering with the distributed database 300. The private key used to sign may be necessary to generate or retroactively modify a block or record of the distributed database 300. Only the device or entity with the private key may alter or add to the distributed database 300. The device or the entity may comprise an administrator of the distributed database 300.

The distributed database 300 may comprise a genesis block 310. The genesis block 310 may comprise the first block of the distributed database 300. The genesis block 310 may comprise the oldest block or the first block generated of the distributed database 300. The genesis block 310 may be associated with a device, such as a computing device. The genesis block 310 may comprise data identifying the computing device. The computing device may be associated with an entity, such as a user, a household, or a service provider. The computing device may generate the genesis block 310. The computing device may generate the distributed database record of the genesis block 310. The computing device may transmit the distributed database record to the distributed database 300 or to a network. The computing device may record the distributed database record in the genesis block 310. The computing device may generate the distributed database 300. The computing device may generate the subsequent blocks 320, 330, 340 of the distributed database 300. The computing device may generate the distributed database entries of the subsequent blocks 320, 330, 340. The computing device may transmit the distributed database entries of the subsequent blocks 320, 330, 340 to the distributed database 300 or to a network.

The genesis block 310 may be associated with an application. The application may comprise a software program. The application may comprise a computing device application or a mobile device application, such as an application for providing access to a service provider's platform. The application may be associated with an entity, such as a user, a household, or a service provider. The application may generate the genesis block 310. The application may generate the distributed database record of the genesis block 310. The application may generate e the distributed database record of the genesis block 310 or the genesis block 310 upon activation of the application. Activation of the application may comprise running the application, opening the application, or downloading the application. The application may transmit the distributed database record of the genesis block 310 to the distributed database 300 or to a network. The application may record the distributed database record in the genesis block 310. The application may generate the distributed database 300. The application may generate the subsequent blocks 320, 330, 340 of the distributed database 300. The application may generate the distributed database entries of the subsequent blocks 320, 330, 340. The application may transmit the distributed database entries of the subsequent blocks 320, 330, 340 to the distributed database 300 or to a network.

The distributed database 300 may comprise a component of a distributed database. The distributed database 300 may comprise a branch of another blockchain, such as a general blockchain. The general blockchain may comprise a plurality of branches. Each of the plurality of branches may comprise a blockchain or another plurality of blockchains. The general blockchain may comprise a plurality of blockchains. Each of the plurality of blockchains may comprise a register of associated devices. Each of the plurality of blockchains may be associated with a common entity, such as a user, a household, or a service provider. The general blockchain may comprise a register of devices associated with an entity and each of the plurality of blockchains may comprise a register of devices associated with a sub-entity of the entity. The general blockchain may be associated with a company. Each of the plurality of blockchains may comprise a register of devices associated with a department of the company.

The distributed database 300 may be stored at a distributed network. The distributed database 300 may be stored across nodes, such as the nodes 110 of FIG. 1, in a distributed network, such as the network 100 of FIG. 1. The nodes may comprise computing devices. The nodes may comprise associated devices. The nodes may comprise devices associated with the blocks 310, 320, 330, 340 of the distributed database 300. The nodes may comprise devices identified by the data in the blocks 310, 320, 330, 340 of the distributed database 300.

The distributed database 300 may be updated. Updating the distributed database 300 may comprise creating a distributed database record. Updating the distributed database 300 may comprise transmitting a distributed database record to the distributed database 300 or a network. Updating the blockchain may comprise recording the distributed database record in a block 310, 320, 330, 340 of the distributed database 300. Updating the blockchain may comprise creating a block 310, 320, 330, 340 of the distributed database 300.

The distributed database 300 may be updated by a computing device or an application. The distributed database 300 may be updated by a computing device associated with the distributed database 300, such as a computing device identified by data in a block 310, 320, 330, 340 of the distributed database 300. The blockchain may be updated by a computing device associated with an entity associated with the blockchain. The distributed database 300 may be updated by a device comprising software to access the distributed database 300.

The software may comprise an application or custom software. The software may comprise a custom software library. The software may comprise software configured to enable a device to generate a distributed database record. The software may comprise software configured to enable a device to submit the distributed database record to the distributed database or to a network of nodes associated with the distributed database. The software may be configured to enable a device to compute a distributed database address of another device based on a public key of the other device. The software may be configured to enable a device to authenticate an record, such as a block, of the distributed database. The software may be configured to enable a device to validate an record, such as a block. Using the software, the device may validate that the record is signed by another associated device.

The distributed database 300 may be updated by a user. However, the distributed database 300 or a system may be configured such that a user has limited access to the distributed database 300. The distributed database 300 or the system may be configured such that a user may not update the distributed database 300 or may not directly update the distributed database 300.

Updating the distributed database 300 may comprise creating a distributed database record, such as using the custom software library. Updating the distributed database 300 may comprise transmitting the distributed database record to the distributed database 300 or a network. Updating the distributed database 300 may comprise recording the distributed database record in a new block of the distributed database 300. Updating the distributed database 300 may comprise creating a new block. Updating the distributed database 300 may comprise transmitting a new block to the distributed database 300 or a network. Updating the distributed database 300 may comprise performing underlying blockchain integration, such as validating a new block or performing a proof to add a new block to the blockchain.

Updating the blockchain may comprise using custom software. The software may comprise a custom software library. The software may comprise software configured to enable a device to generate a distributed database record. The software may comprise software configured to enable a device to submit the distributed database record to the distributed database or to a network of nodes associated with the distributed database. The software may be configured to enable a device to compute a distributed database address of another device based on a public key of the other device. The software may be configured to enable a device to authenticate a record, such as a block, of the distributed database. The software may be configured to enable a device to validate a record, such as a block. Using the software, the device may validate that the record is signed by another associated device.

Figure 4:
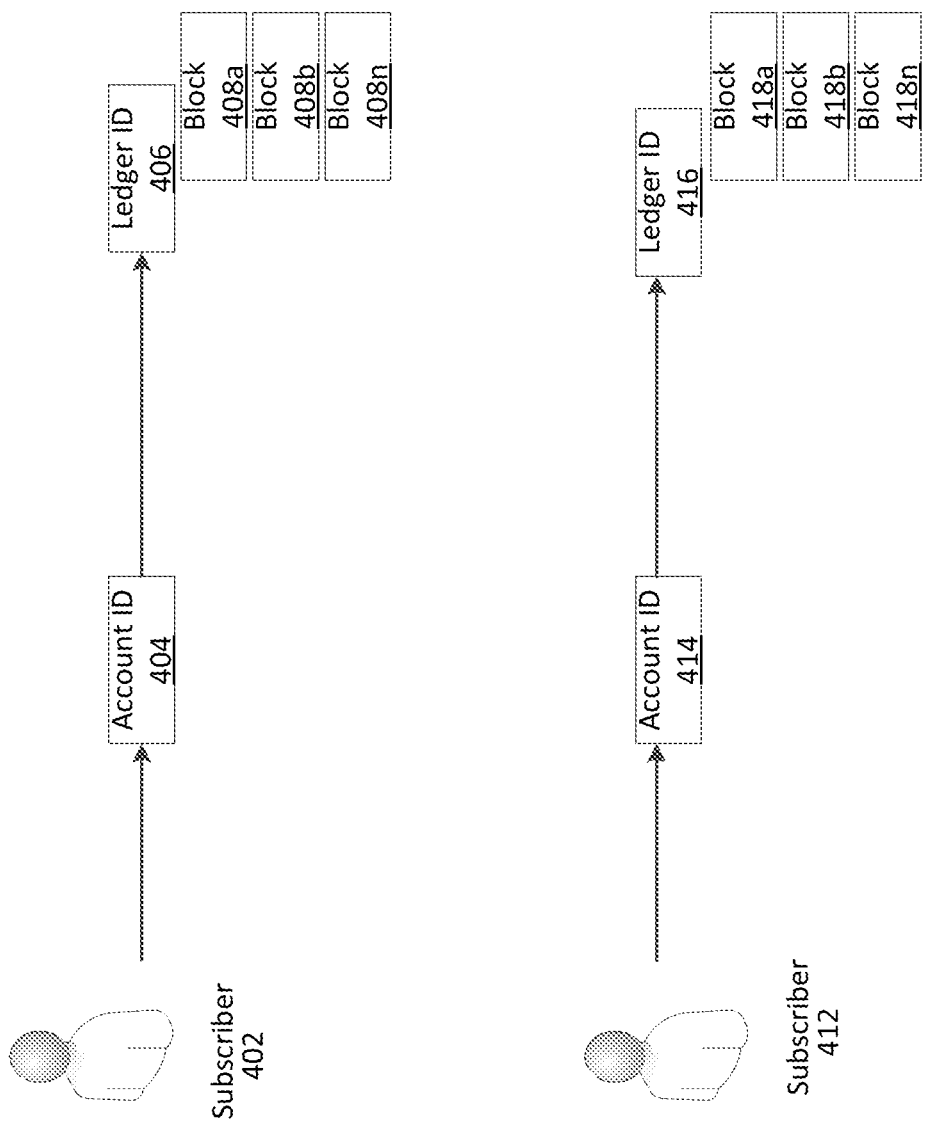
FIG. 4 shows an example distributed ledger system.

FIG. 4 shows an example distributed ledger system. In the example distributed ledger system, a distributed ledger (e.g., blockchain, etc.) is generated for each subscriber (e.g., primary authority holder, etc.). In the example distributed ledger system, a first subscriber 402 may sign up for a first account with a service provider. The service provider may provide the first subscriber 402 with a first account identifier 404. The first account identifier 404 may be used to relate the first subscriber 402 with the first account. The first account identifier 404 may be unique. The first account identifier 404 may comprise a series of numbers, letters, and/or symbols.

A first distributed ledger associated with the first account may be generated. The first distributed ledger may comprise a first ledger identifier 406. The first ledger identifier 406 may be and/or comprise a derivation of the first account identifier 404. The first ledger identifier 406 may be used to relate the first distributed ledger with the first account and/or the first subscriber 402 and/or the first account identifier 404. The first ledger identifier 406 may be unique. The first ledger identifier 406 may comprise a series of numbers, letters, and/or symbols.

The first distributed ledger may comprise a first set of one or more records 408a,b,n (e.g., blocks). The first set of one or more records 408a,b,n may comprise information indicative of administrative rights and/or permissions for users and/or devices associated with the first distributed ledger. Each record of the first set of one or more records 408a,b,n may comprise zero, one, or more records. Each record may comprise information indicative of administrative rights and/or permissions relating to a single user and/or a single device. Records will be discussed in more detail in reference to FIG. 5 below. The first set of one of more records 408a,b,n may be stored and/or created on the first distributed ledger by a node 110 of FIG. 1 performing a proof protocol. Each record 408a,b,n may contain a number of transactions configured to achieve compact block size for ease of propagation. The compact block size may comprise a data size of 1 KB, as an example. The number of transactions configured to achieve compact block size may be one transaction per record, as an example.

In the example distributed ledger system, a second subscriber 412 may sign up for a second account with the service provider. The service provider may provide the second subscriber 412 with a second account identifier 414. The second account identifier 414 may be used to relate the second subscriber 412 with the second account. The second account identifier 414 may be unique. The second account identifier 414 may comprise a series of numbers, letters, and/or symbols.

A second distributed ledger associated with the second account may be generated. The second distributed ledger may comprise a second ledger identifier 416. The second ledger identifier 416 may be and/or comprise a derivation of the second account identifier 414. The second ledger identifier 416 may be used to relate the second distributed ledger with the second account and/or the second subscriber 412 and/or the second account identifier 414. The second ledger identifier 416 may be unique. The second ledger identifier 416 may comprise a series of numbers, letters, and/or symbols.

The second distributed ledger may comprise a second set of one or more records 418a,b,n. The second set of one or more records 418a,b,n may comprise information indicative of administrative rights and/or permissions for users and/or devices associated with the second distributed ledger. Each record of the second set of one or more records 418a,b,n may comprise zero, one, or more records. Each record may comprise information indicative of administrative rights and/or permissions relating to a single user and/or a single device. Records will be discussed in more detail in reference to FIG. 5 below. The second set of one of more records 418a,b,n may be stored and/or created on the second distributed ledger by a node 110 of FIG. 1 performing a proof protocol. Each record 418a,b,n may contain a number of transactions configured to achieve compact block size for ease of propagation. The compact block size may comprise a data size of 1 KB, as an example. The number of transactions configured to achieve compact block size may be one transaction per record, as an example.

A user may be identified by unique credentials, such as login information collected by an application. A device may be identified by a device identifier, such as a media access control address (MAC address). A user and/or a device may be identified by a digital certificate.

A user with administrative rights may be able to grant administrative rights and/or permissions to other users and/or devices. Examples of permissioned device functions and/or actions may comprise device replacement (warranty), accessing data stored on a device, making purchases with saved payments, submitting a claim for a device, switching plans (e.g., data plan, payment plan, protection plan, etc.), changing a service address (having new device sent to new address), the like, and/or any combination of the foregoing.

Figure 5:
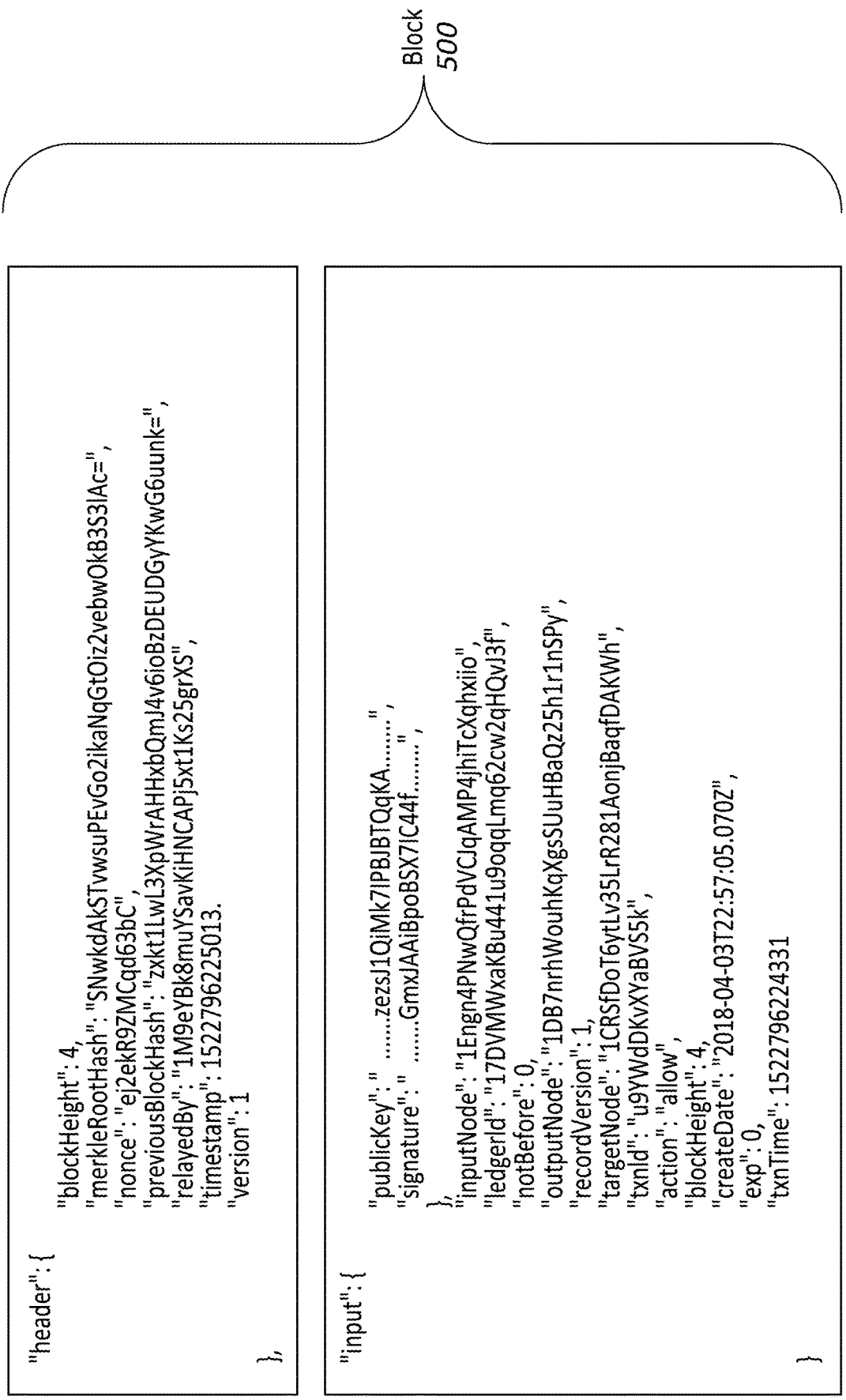
FIG. 5 shows an example distributed ledger record.

FIG. 5 shows an example record 500 (e.g., block) of a distributed ledger (e.g., blockchain). The record 500 may comprise any of the records 408a,b,n from FIG. 4. Although FIG. 4 shows the record 500 comprising one record (e.g., transaction, etc.), a record may comprise zero, one, or more records. Each record may have a constant size, such as 1 kilobyte. The record 500 may comprise a header section and an input section. The header section may comprises various fields, such as a record height (e.g., a number of records in a distributed ledger), a merkle root hash (a hash of transaction hashes in the record 500), a nonce (a counter used by miners (such as the nodes 110 in FIG. 1) to generate a correct hash), a previous record hash, relayed by (address of a device that relayed the record 500), timestamp, version, the like, and/or any combination of the foregoing.

The input section of the record 500 may comprise various fields, such as a public key, a signature, an input node, a ledger identifier (for identifying the distributed ledger associated with the account related to the transaction), a beginning date and/or time for permissions and/or rights granted by the transaction, an output node, a record version, a target node, a transaction identifier, an action (a description of what permissions and/or rights the transaction comprises), a record height, a date of generation, an expiration date and/or time for permissions and/or rights granted by the transaction, a transaction time, the like, and/or any combination of the foregoing.

The record 500 and/or the record in the record 500 may be verified using values in a "publicKey" field and a "signature" field. A value in "inputNode" may identify a device associated with a user creating the record (e.g., the user granting the rights and/or permissions that are a subject of the record, etc.). A value in "outputNode" may identify a device associated with a user receiving the rights and/or permissions that are the subject of the record. A value in "targetNode" may identify a device that is the subject of the rights and/or permissions. A value in "inputNode" may identify a mobile device associated with a primary authority holder that is granting rights to access a camera to a second user; the value in "outputNode" may identify a mobile device associated with the second user; and the value in "targetNode" may identify the camera associated with the primary authority holder.

A value in "action" may indicate that the second user is allowed to access the camera. A value in "notBefore" may comprise a time representation and may indicate that the second user is allowed to access the camera immediately after the notBefore value. A value in "exp" may comprise a time representation and may indicate that the second user will not be allowed to access the camera after a time of the indicated value has passed. A value of zero may indicate that access is always granted until permission to access the camera is revoked by the primary authority holder. Permission to access the camera may be revoked by the primary authority holder by adding a record to the distributed ledger comprising an action of "revoke".

Figure 6:
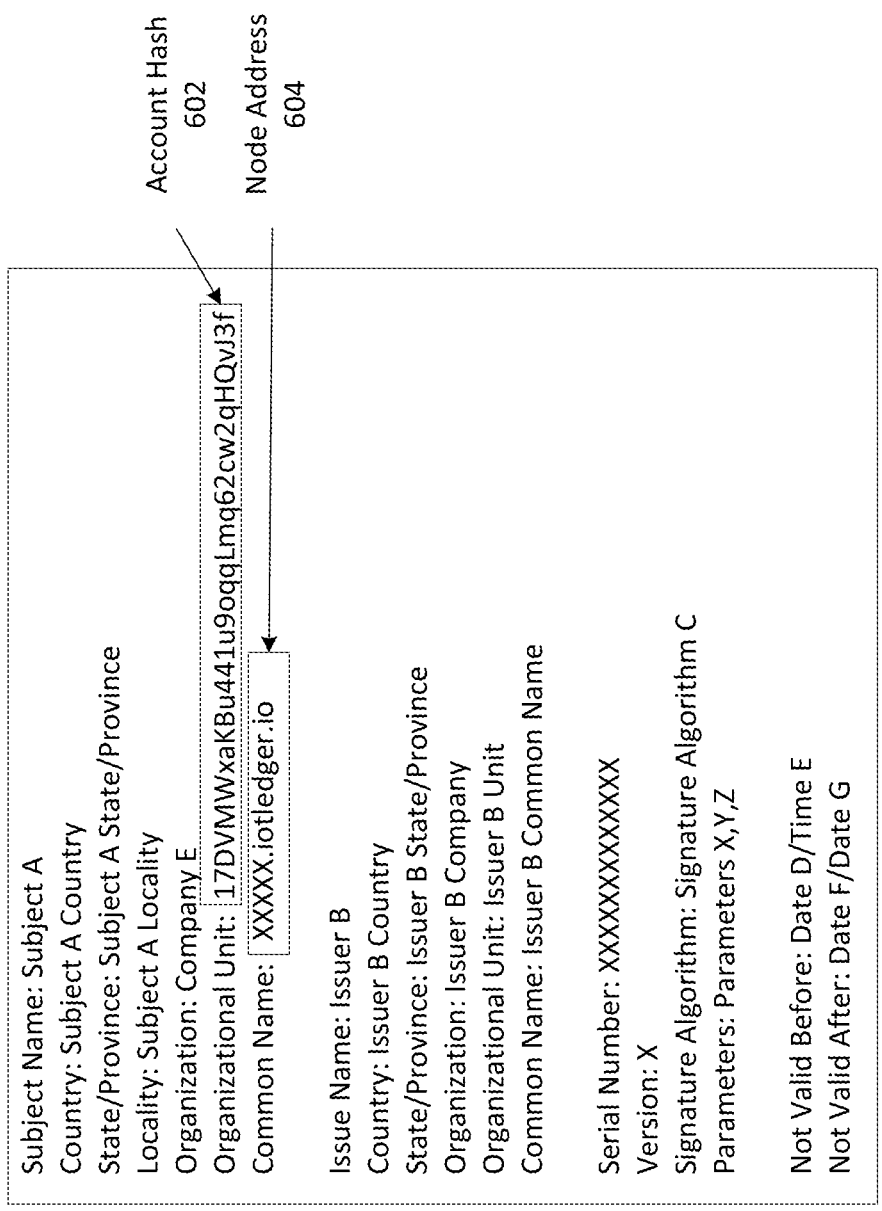
FIG. 6 shows an example digital certificate.

FIG. 6 shows an example digital certificate 600. The digital certificate 600 may comprise a X.509 certificate. The digital certificate 600 may be issued for a subject. The digital certificate 600 may comprise information about the subject. Information about the subject may comprise location information (country, state, province, locality, etc.), organization, organizational unit, common name, etc. A value of the subject organizational unit field may comprise an account hash 602. An account identifier associated with the subject may be input into a hashing algorithm. The account hash 602 may comprise an output of the hashing algorithm. A value of the subject common name field may comprise an address, such as a media access control address (MAC address), an Internet Protocol (IP) address, a Uniform Resource Locator (URL) address, and/or any other address. The value of the subject common name field may comprise a node address 604 associated with the subject.

The digital certificate 600 may be issued by an issuer. The digital certificate 600 may comprise information about the issuer. The issuer may comprise a service provider. The issuer may comprise a certificate authority. Information about the issuer may comprise location information (country, state, province, locality, etc.), organization, organizational unit, common name, etc. A value in the issuer organizational unit field may comprise a unit (e.g., division, branch, etc.) within an organization. A value in the issuer common name field may comprise a name to identify a type of digital certificate 600.

The digital certificate 600 may comprise a serial number, a version, parameters, a start date, an expiration date, etc. The digital certificate may comprise a signature algorithm, such as a ECDSA Signature with SHA-256. A value in the serial number may uniquely identify the digital certificate 600. A value in the version field may identify one or more settings for the digital certificate 600. A value in the signature algorithm may comprise a digital signature algorithm and/or a hashing function associated with the digital certificate 600. A value in the start date may identify a date, before which the digital certificate 600 will not be valid. A value in the expiration date may identify a date, after which the digital certificate 600 will not be valid. The dates may comprise days and/or times.

The digital certificate 600 may comprise information that may be stored and/or created on a distributed ledger associated with the subject. The digital certificate 600 may be stored on a user device associated with the subject. The digital certificate 600 may be used to authorize and/or authenticate the user device associated with the subject. The digital certificate 600 may be used to verify a public key.

Figure 7:
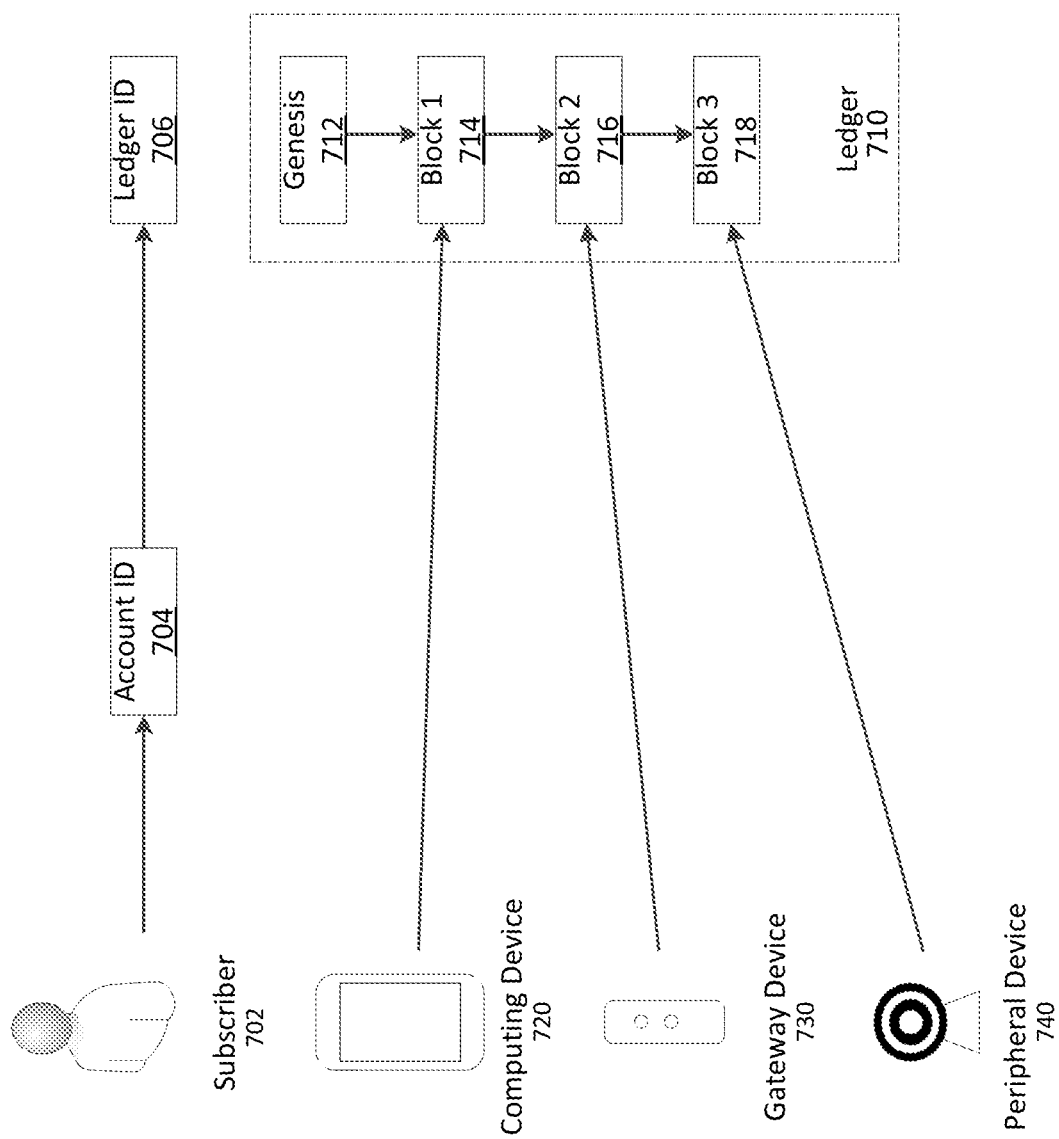
FIG. 7 shows an example distributed ledger system.

FIG. 7 shows an example distributed ledger. A subscriber 702 may comprise an account with a service provider. The account may allow the subscriber to access a platform. An account identifier 704 may uniquely identify the account associated with the subscriber 702. The account identifier 704 may comprise numbers, letters, characters, symbols, etc. The account identifier 704 may be used to generate a ledger identifier 706. The ledger identifier 706 may be used to associate the account and/or the subscriber 702 and/or the account identifier 704 with a distributed ledger 710. The distributed ledger 710 may comprise records indicating devices associated with the account and/or the subscriber 702, such as devices belonging to the primary authority holder of the account. For example, based on the subscriber 702 inboarding a device, a record indicating the devices may be added to the distributed ledger 710. The distributed ledger 710 may comprise an original record 712 (e.g., a genesis block). The original record 712 may be generated when the distributed ledger 710 is generated.

The subscriber 702 may wish to allow a computing device 720 (e.g., smart phone, tablet, laptop, desktop, smart wearable device, etc.) to access the platform. The computing device 720 may comprise one or more of the one or more nodes 110 in FIG. 1. A record 714, may be stored and/or created on the distributed ledger 710, wherein the record 714 may comprise information indicating platform permissions and/or rights associated with the computing device 720. The computing device 720 may provide a node address associated with the computing device 720 in a message signed by a private key associated with the computing device 720. The provided node address associated with the computing device 720 may be stored in the record 714. The message signed by a private key associated with the computing device 720 may be verified by a public key associated with the computing device 720.

The subscriber 702 may wish to allow a gateway device 730 (e.g., cable modem, router, network access point, etc.) to access the platform. The gateway device 730 may comprise one or more of the one or more nodes 110 in FIG. 1. A record 716, may be stored and/or created on the distributed ledger 710, wherein the record 716 may comprise information indicating platform permissions and/or rights associated with the gateway device 730. The gateway device 730 may provide a node address associated with the gateway device 730 in a message signed by a private key associated with the gateway device 730. The provided node address associated with the gateway device 730 may be stored in the record 716. The message signed by a private key associated with the gateway device 730 may be verified by a public key associated with the gateway device 730.

The subscriber 702 may wish to allow a peripheral device 740 (e.g., camera, microphone, printer, etc.) to access the platform. The peripheral device 740 may comprise one or more of the one or more nodes 110 in FIG. 1. A record 718, may be stored and/or created on the distributed ledger 710, wherein the record 718 may comprise information indicating platform permissions and/or rights associated with the peripheral device 740. The peripheral device 740 may provide a node address associated with the peripheral device 740 in a message signed by a private key associated with the peripheral device 740. The provided node address associated with the peripheral device 740 may be stored in the record 718. The message signed by a private key associated with the peripheral device 740 may be verified by a public key associated with the peripheral device 740.

Based on a request to access the platform via the account associated with the subscriber 702, the distributed ledger 710 may be accessed. Based on a record on the distributed ledger 710 indicating that a device initiating a request to access the platform comprises permission to perform the requested access, the device may be allowed to access the platform. To determine if permissions and/or rights exist, the records 712, 714, 716, 718 of the distributed ledger 710 may be examined for a transaction with a node address for a device seeking permission and/or a device to which access is being sought and/or a device associated with an account to which permission is being sought. Although FIG. 7 shows a distributed ledger 710 generated for an account, it is contemplated that a distributed ledger may be generated for each account. Each record in the distributed ledger may indicate permissions and/or rights for the corresponding device.

Figure 8:
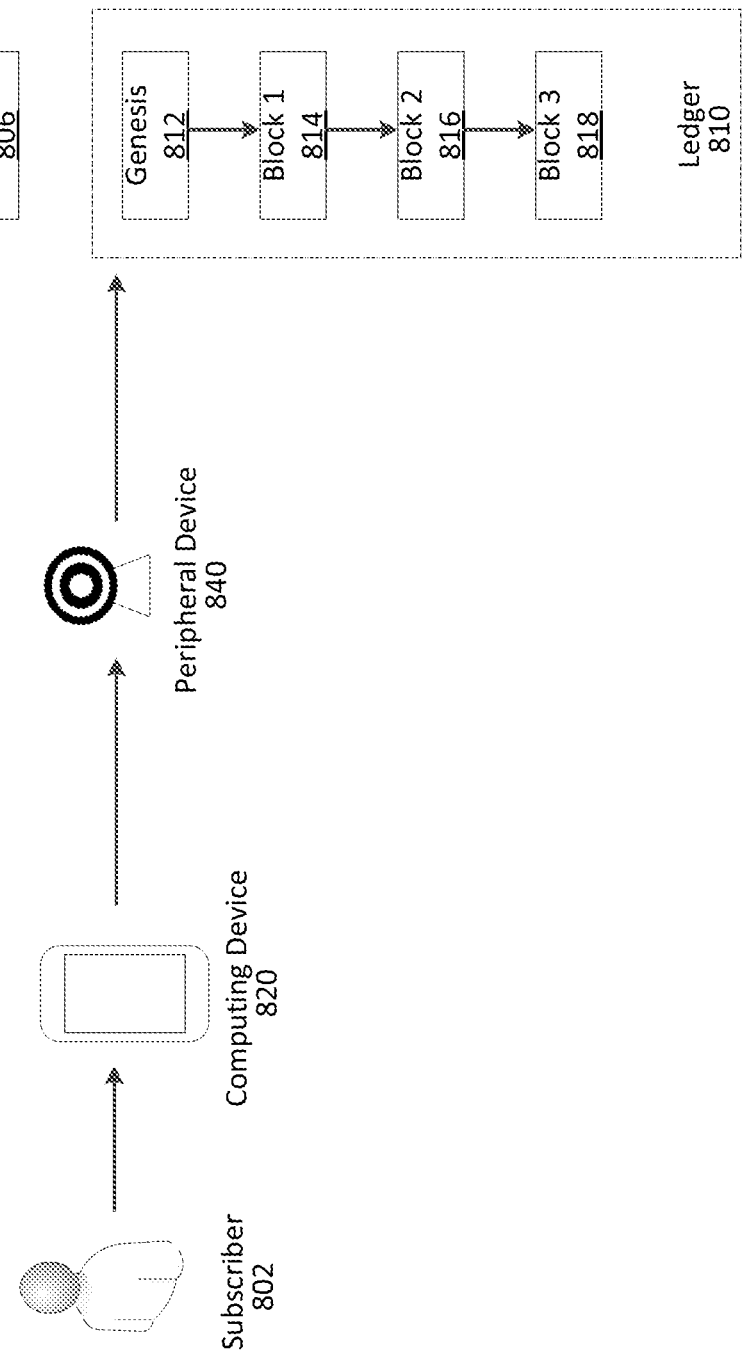
FIG. 8 shows an example distributed ledger system.

FIG. 8 shows an example distributed ledger. A subscriber 802 may use an application executing (e.g., running, etc.) on a computing device 820. The subscriber 802 may comprise an account with a service provider. The subscriber 802 may access the account by logging into the application. The account may allow the subscriber 802 to access a platform. The subscriber 802 may comprise the subscriber 702 in FIG. 7. The account may comprise the account in FIG. 7. The computing device 820 may comprise the computing device 720 in FIG. 7.

The subscriber 802 may request access to a peripheral device 840 via the application executing on the computing device 820. The peripheral device 840 may comprise the peripheral device 740 in FIG. 7. The peripheral device 840 may receive a digital certificate from the computing device 820. The digital certificate may comprise an X.509 certificate. The peripheral device 840 may verify a public key belongs to the computing device 820 and/or the peripheral device 840.

The peripheral device 840 may determine a ledger identifier 806 associated with the account stored in the X.509 certificate. The ledger identifier 806 may comprise the ledger identifier 706 in FIG. 7. The ledger identifier 806 may be associated with a distributed ledger 810. The distributed ledger 810 may comprise on original record 812 (e.g., a genesis block). In addition to the original record 812, the distributed ledger 810 may comprise one or more records 814,816,818. The distributed ledger 810 may comprise the distributed ledger 710 in FIG. 7.

The peripheral device 840 may examine the records 812, 814,816,818 on the distributed ledger 810. The peripheral device 840 may determine that the peripheral device 840 signed the record 818. The peripheral device 840 may determine that the record 818 indicates that the computing device 820 is allowed to access the peripheral device 840. The peripheral device 840 may determine that the record 818 indicates that the computing device 820 is allowed to access the peripheral device based on determining that the record 818 comprises a transaction with an address associated with the computing device 820. In response to examining the record 818, the peripheral device may grant access to the computing device 820.

Although FIG. 8 shows a "per account" distributed ledger 810, it is contemplated that a distributed ledger may be generated for each device (a per device blockchain). In a per device distributed ledger, the peripheral device 840 may examine a distributed ledger associated with the peripheral device 840, a distributed ledger associated with the computing device 820, or both.

Figure 9:
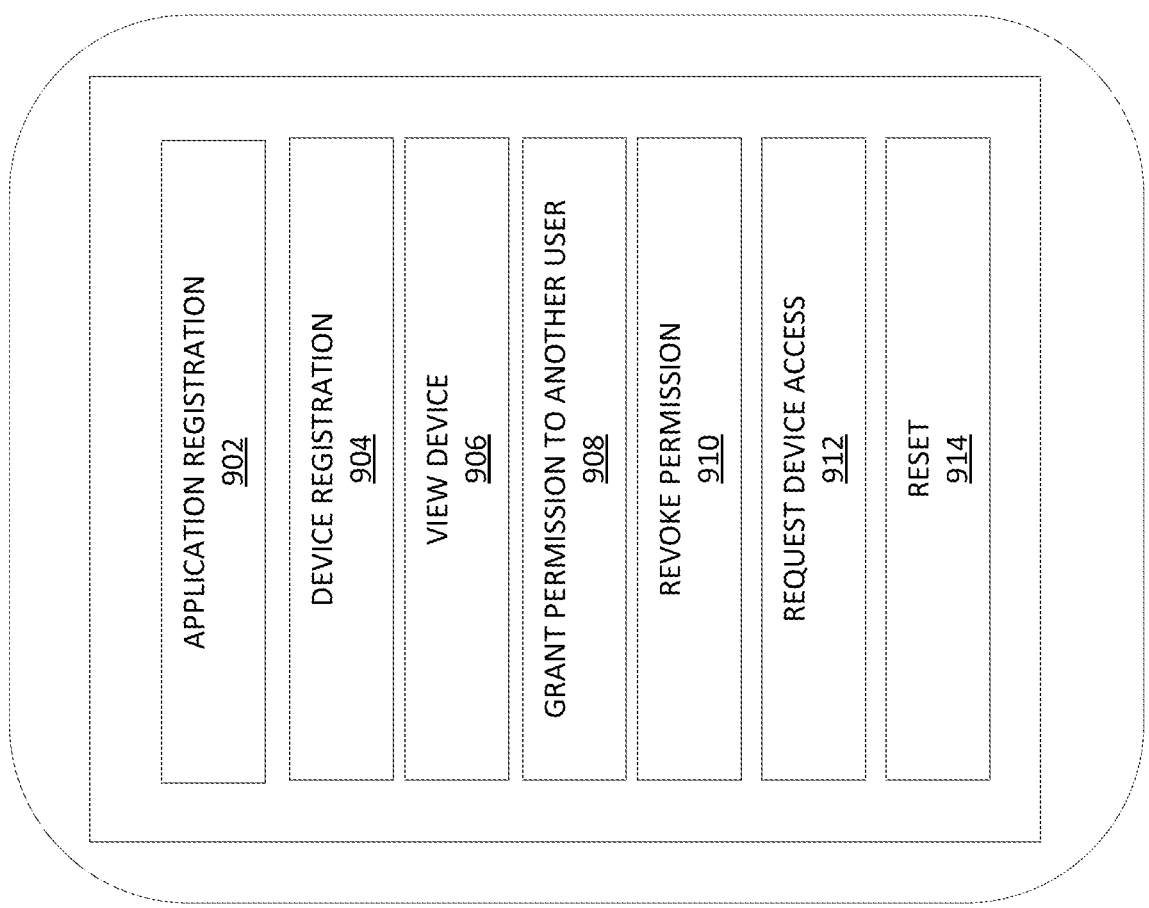
FIG. 9 shows an example user interface.

FIG. 9 shows an example user interface of an application running on a computing device 900. The application may comprise an application executing (e.g., performing, running, etc.) on the computing device 720 in FIG. 7 and/or the computing device 820 in FIG. 8. The user interface may comprise one or more buttons 902, 904, 906, 908, 910, 912, 914 for interacting with a platform provided by a service provider.

A button 902 on the user interface may allow a user to register with the platform. The button 902 may allow a user to associate a username and/or a password with an account to access the platform. The button 902 may cause an association of a digital certificate, such as the digital certificate 600 in FIG. 6, and/or information within a digital certificate with the account. The button 902 may cause an association of an identifier with the account. The button 902 may cause a distributed ledger associated with the account to be generated.

A button 904 on the user interface may allow a user to register a device with the platform. The button 904 may cause an association of a digital certificate, such as the digital certificate 600 in FIG. 6, and/or information within a digital certificate with the account. The button 904 may cause a record to be stored on (e.g., posted to, entered on, created on, etc.) the distributed ledger associated with the account. The button 904 may cause a distributed ledger associated with the device being registered to be generated.

A button 906 on the user interface may allow a user to view details about devices available to the user via the platform. Details about devices available to the user via the platform may comprise permissions and/or rights the user has in relationship to the devices. Details about devices available to the user via the platform may comprise permissions and/or rights other users comprise in relationship to the devices. The button 906 may allow a user to view details about devices on the platform. Details about devices on the platform may comprise permissions and/or rights the user has in relationship to the devices. Details about devices on the platform may comprise permissions and/or rights other users comprise in relationship to the devices. The button 906 may allow a user to view which users are currently accessing and/or controlling devices via the platform. A distributed ledger may dictate which devices are viewable (e.g., visible, available, etc.) to a particular device and/or user and what details about the devices are viewable.

A button 908 on the user interface may allow a user to grant rights and/or permissions to another user and/or device. The button 908 may allow the user to associate another username and/or another password with the account to access the platform. The button 908 may cause an association of a second digital certificate, such as the digital certificate 600 in FIG. 6, and/or information within a second digital certificate with the account. The button 908 may cause a record to be stored on (e.g., added to, posted to, entered on, created on, etc.) the distributed ledger associated with the account. The button 908 may cause a distributed ledger associated with the other user and/or the other device being registered to be generated.

A button 910 on the user interface may allow a user to revoke permission. The button 910 may remove an association of a username and/or a password and/or a digital certificate with the account. The button 910 may cause a record indicating that permission has been revoked to be stored and/or created on the distributed ledger. The button 910 may cause a distributed ledger and/or a digital certificate associated with a user and/or a device to be removed (e.g., deleted, etc.).

A button 912 on the user interface may allow a user to request device access. The button 912 may allow a user to access and/or control a device available to the user via the platform. The button 912 may cause a username, a password, and/or a digital certificate associated with the user and/or the computing device 900 to be verified. The button 912 may cause a distributed ledger to be examined for a record associated with the user and/or the computing device 900. Based on the username, the password, and/or the digital certificate associated with the user and/or the computing device 900 to be verified and a record associated with the user and/or the computing device 900 indicating authorization to access the requested device, the requested device may be accessed.

A button 914 on the user interface may allow to reset the account. The button 914 may cause all associations of an account and usernames, passwords, and/or digital certificates to be removed (e.g., deleted, erased, etc.). The button 914 may cause all distributed ledgers associated with the account to be removed.

Figure 10:
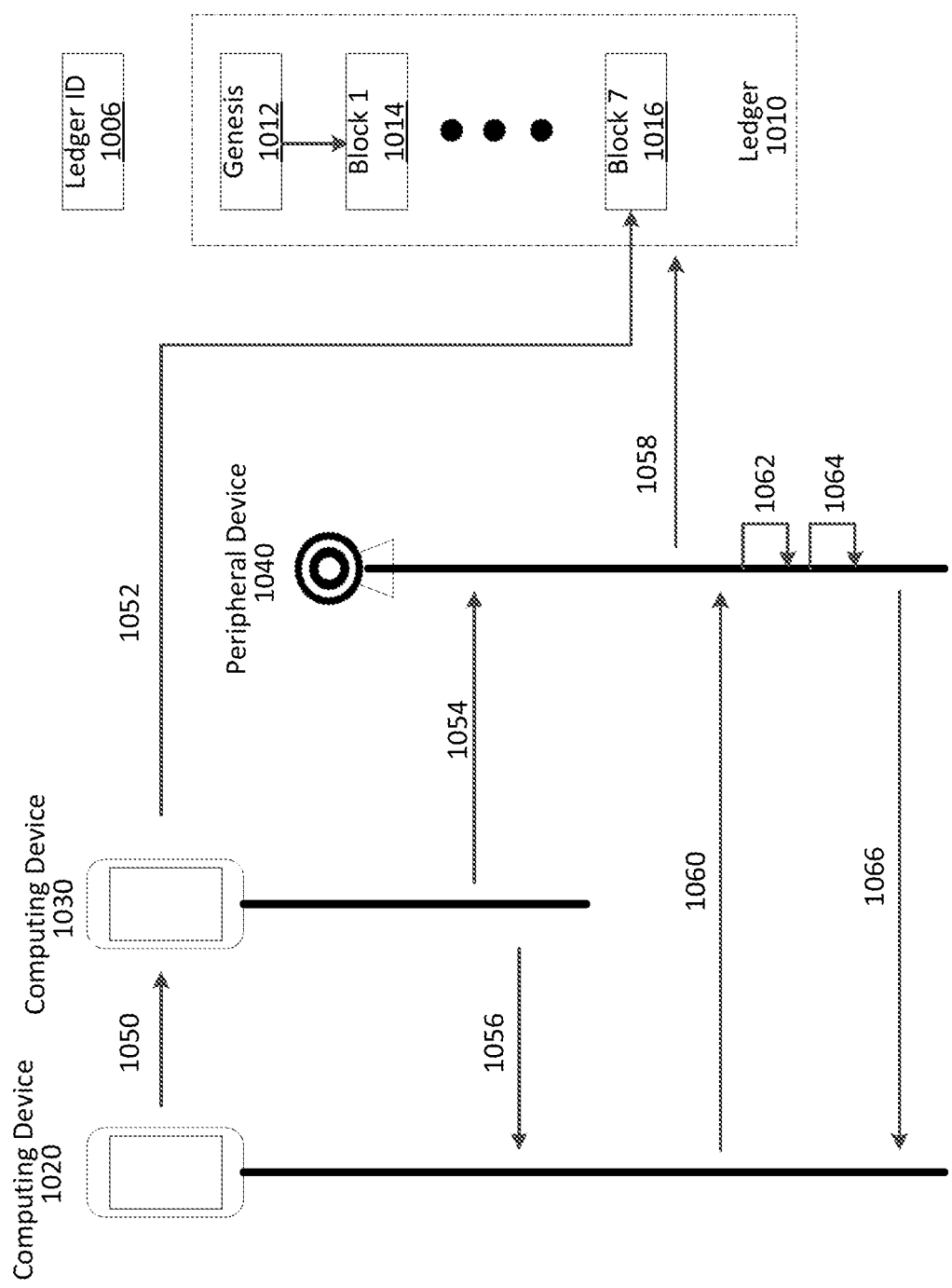
FIG. 10 shows an example method.

FIG. 10 shows a diagram illustrating an example sequence for using a distributed ledger to secure access permissions (e.g., rights, etc.). At step 1050, a first computing device 1020 may transmit (e.g., send, etc.) a request to access a peripheral device 1040 to a second computing device 1030. The first computing device 1020 and/or the second computing device 1030 may comprise the computing device 720 in FIG. 7. The peripheral device 1040 may comprise the peripheral device 740 in FIG. 7. The request to access the peripheral device 1040 may comprise a request to access the peripheral device 1040 via a platform associated with a service provider via an account associated with the second computing device 1030 and/or a user of the second computing device 1030. The request to access the peripheral device 1040 may comprise a digital certificate, such as the digital certificate 600 in FIG. 6. The request may be generated by a first user via an application executing on the first computing device 1020. The request may be presented to a second user via an application executing on the second computing device 1030.

At step 1052, the second computing device 1030 may cause a record 1016 to be stored and/or created on a distributed ledger 1010 associated with the account associated with the second computing device 1030 and/or a user associated with the second computing device 1030. The distributed ledger 1010 may be identified by a ledger identifier 1006. The distributed ledger 1010 may comprise an original record 1012 (e.g., genesis block) and other records 1014, 1016 comprising permission and/or right information. The record 1016 may comprise a transaction. The transaction may comprise an address associated with the peripheral device 1040. The transaction may comprise an address associated with the first computing device 1020. An address may comprise a media access control address (MAC address), an Internet Protocol (IP) address, a Uniform Resource Locator (URL) address, and/or any other address. The address may be associated with a distributed ledger. The transaction may comprise an expiration date, such as an indication of an expiration in three days. The transaction may comprise a transaction as described in reference to the transaction in record 500 in FIG. 5. The record 1016 may be signed by the second computing device 1030.

At step 1054, the second computing device 1030 may send a request to the peripheral device 1040 to update distributed ledger information. At step 1056, the second computing device 1030 may send information for accessing the peripheral device 1040 to the first computing device 1020. Information for accessing the peripheral device 1040 may comprise an address for the peripheral device 1040. The address for the peripheral device 1040 may comprise a media access control address (MAC address), an Internet Protocol (IP) address, a Uniform Resource Locator (URL) address, and/or any other address.

At step 1058, the peripheral device 1040 may update distributed ledger information in response to the request received at 1054. At step 1060, the first computing device 1020 may transmit a request for access to the peripheral device 1040. The request for access may comprise a digital certificate, such as the digital certificate 600 in FIG. 6. At step 1062, the peripheral device 1040 may use information from the request and/or digital certificate to calculate an address associated with the first computing device 1020. The calculated address represents the ledger address of device 1020 hashed from its public key. The address may be associated with a distributed ledger. At step 1064, the peripheral device 1040 may examine the updated ledger information to look for the calculated address. On examining the record 1016 with the address of the first computing device 1020, the peripheral device 1040 may authorize (e.g., authenticate, verify, validate, etc.) the first computing device 1020. At step 1066, the peripheral device 1040 may send an acknowledgement to the first computing device 1020 in response to authorizing the first computing device 1020. After the acknowledgement is sent, the first computing device 1020 may access and/or control the peripheral device 1040.

Figure 11:
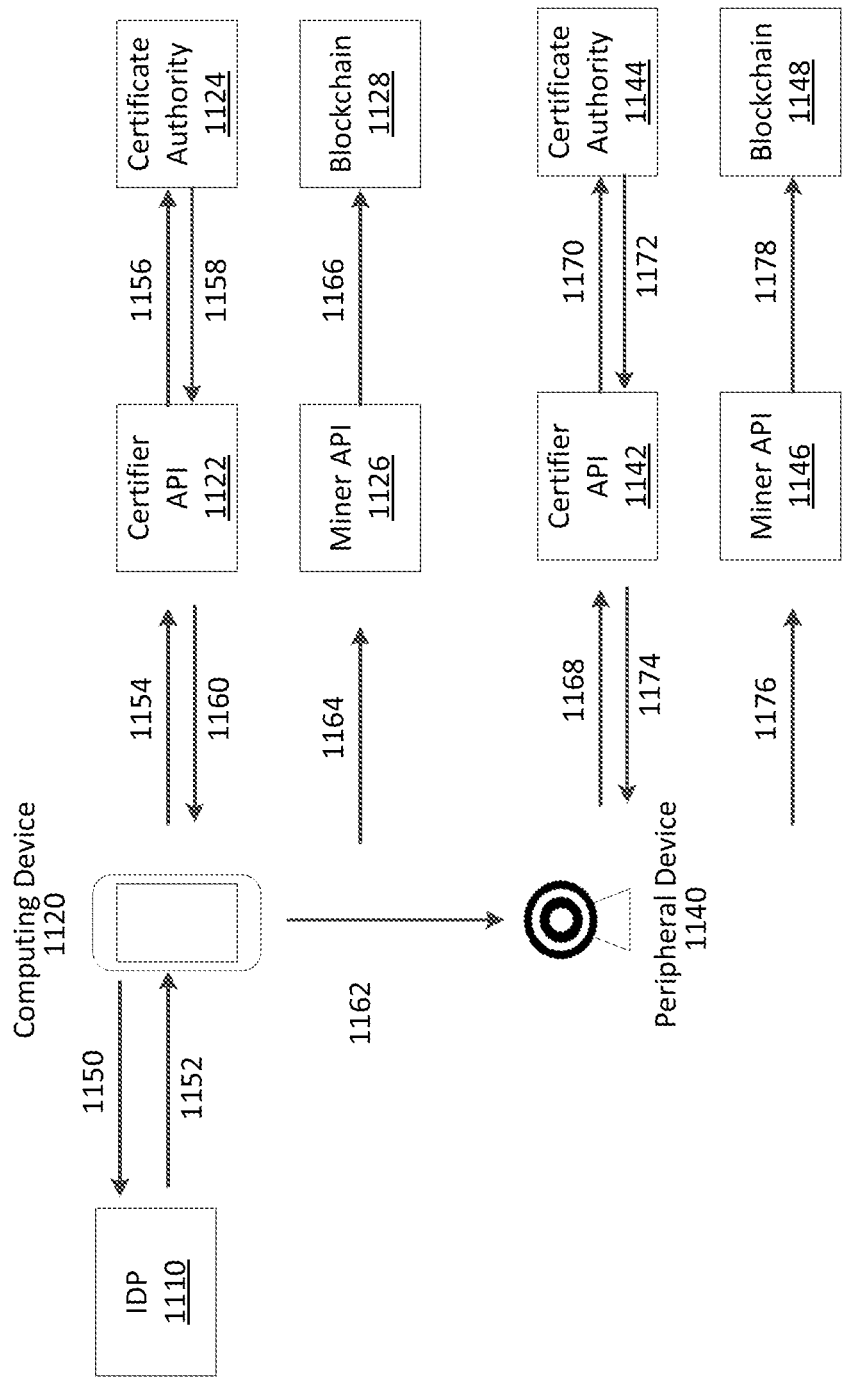
FIG. 11 shows an example method.

FIG. 11 shows a diagram illustrating an example sequence for using a distributed ledger to secure access permissions (e.g., rights, etc.). At step 1150, a computing device 1120 may transmit (e.g., send, etc.) a request for a first token to an identity provider (IDP) 1110. The computing device 1120 may comprise the computing device 720 in FIG. 7. The IDP 1110 may be associated with a service provider. The request for the first token may be delivered via a transport layer security (TLS) message. The request for the first token may be delivered via a TLS 1.2 message. The request for the first token may be delivered via a platform associated with the service provider via an account associated with the computing device 1120 and/or a user of the computing device 1120. The request for the first token may be generated by a user via an application executing on the computing device 1120. The first token may be an IDP token.

At step 1152, the IDP 1110 may transmit the first token to the computing device 1120. The IDP 1110 may transmit the first token to the computing device 1120 in response to the request at step 1150. The first token may be delivered to the computing device 1120 via a TLS message. The first token may be delivered to the computing device 1120 may be delivered via a TLS 1.2 message. At step 1154, the computing device 1120 may transmit the first token to a certifier application programming interface (API) 1122 associated with the computing device 1120 and a certificate authority 1124. The first token may be delivered to the certifier API 1122 via a TLS message. The first token may be delivered to the certifier API 1122 may be delivered via a TLS 1.2 message.

At step 1156, the certifier API 1122 may validate the first token using one or more digital signatures. The certifier API 1122 may transmit a request for a first digital certificate to the certificate authority 1124. The certifier API 1122 may validate the first token and/or transmit the request in response to receiving and validating the first token. The request for the first digital certificate may be delivered via a TLS message. The request for the first digital certificate may be delivered via a TLS 1.2 message. At step 1158, the certificate authority 1124 may transmit the first digital certificate to the certifier API 1122. The certificate authority 1124 may transmit the first digital certificate to the certifier API 1122 in response to the request for the first digital certificate. The first digital certificate may comprise the digital certificate 600 in FIG. 6. The first digital certificate may be delivered via a TLS message. The first digital certificate may be delivered via a TLS 1.2 message.

At step 1160, the certifier API 1122 may transmit the first digital certificate to the computing device 1120. The first digital certificate may be delivered via a TLS message. The first digital certificate may be delivered via a TLS 1.2 message. At step 1162, the computing device 1120 may transmit the first digital certificate to a peripheral device 1140 to onboard the peripheral device 1140. The peripheral device 1140 may comprise the peripheral device 740 in FIG. 7. The first digital certificate may be delivered via a TLS message. The first digital certificate may be delivered via a TLS 1.2 message.

At step 1164, the computing device 1120 may cause a first record (e.g., transaction, etc.) to be transmitted to a miner API 1126 associated with the computing device 1120 and a distributed ledger 1128. The first record may be signed by the computing device 1120. The first record may be delivered via a TLS message. The first record may be delivered via a TLS 1.2 message. At step 1166, the miner API 1126 may cause the first record to be stored in a first record. The miner API 1126 may cause the first record to be stored and/or created on the distributed ledger 1128. The miner API 1126 may cause the first record to be stored and/or created on the distributed ledger 1128 via a TLS message. The miner API 1126 may cause the first record to be stored and/or created on the distributed ledger 1128 via a TLS 1.2 message.

At step 1168, the peripheral device 1140 may transmit the first digital certificate to a certifier API 1142 associated with the peripheral device 1140 and a certificate authority 1144. The first digital certificate may be delivered to the certifier API 1142 via a TLS message. The first digital certificate may be delivered to the certifier API 1142 may be delivered via a TLS 1.2 message.

At step 1170, the certifier API 1142 may validate the first digital certificate. At step 1172, the certifier API 1142 may transmit a request to a certificate authority. The request may indicate a new certificate for the peripheral device 1140. In response to the request, the certifier API 1142 may receive the new certificate for the peripheral device 1140. The new digital certificate may comprise the digital certificate 600 in FIG. 6. The new digital certificate may be delivered via a TLS message. The new digital certificate may be delivered via a TLS 1.2 message.

At 1174, the certifier API 1142 may transmit the new digital certificate to the peripheral device 1140. The new digital certificate may be delivered via a TLS message. The new digital certificate may be delivered via a TLS 1.2 message.

At step 1176, the peripheral device 1140 may cause a second record (e.g., transaction, etc.) to be transmitted to a miner API 1146 associated with the peripheral device 1140 and a distributed ledger 1148. The second record may be signed by the peripheral device 1140 using a private key associated with the peripheral device 1140. The second record may be delivered via a TLS message. The second record may be delivered via a TLS 1.2 message. At step 1178, the miner API 1146 may cause the second record to be stored and/or created on the distributed ledger 1148. The miner API 1146 may cause the second record to be stored and/or created on the distributed ledger 1148 via a TLS message. The miner API 1146 may cause the second record to be stored on the distributed ledger 1148 via a TLS 1.2 message.

Figure 12:
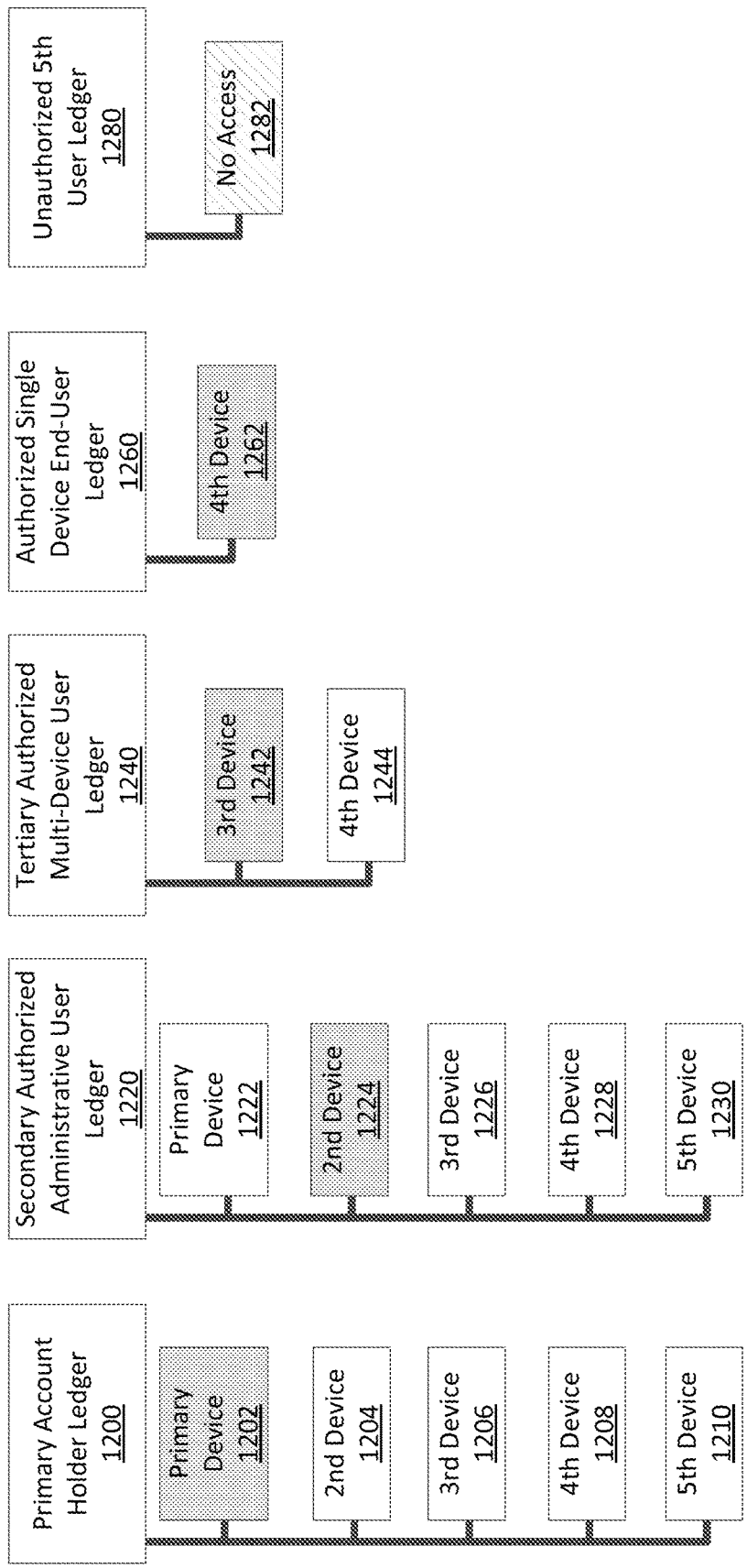
FIG. 12 shows an example distributed ledger system.

FIG. 12 shows an example plurality of distributed ledgers 1200, 1220, 1240, 1260, 1280. A primary authority holder ledger 1200 may be generated based on a primary authority holder initially logging-onto a platform of a service provider through a primary device. A record 1202 may be generated associated with the primary device in the primary authority holder ledger 1200. The record 1202 may comprise a record used to authorize the primary device and/or the primary authority holder to access the platform. The primary authority holder may be able to add and revoke authorized user access to one or more specific devices. The primary authority holder may be able to add and revoke administrative access and/or permissions. The primary authority holder may onboard (e.g., add to an account, etc.) a second device associated with a secondary user and/or authority holder. A record 1204 may be generated associated with the second device in the primary authority holder ledger 1200.

The primary authority holder may onboard a third device associated with a tertiary user. A record 1206 may be generated associated with the third device in the primary authority holder ledger 1200. The primary authority holder may onboard a fourth device associated with a fourth user. A record 1208 may be generated associated with the fourth device in the primary authority holder ledger 1200. The primary authority holder may onboard a fifth device. A record 1210 may be generated associated with the fifth device in the primary authority holder ledger 1200.

Each device in the primary authority holder ledger 1200 for which a permission is recorded, the primary authority holder may be able to view the device and/or details about the device via an application. The record 1202 may indicate that the primary authority holder may view details about the primary device. The record 1204 may indicate that the primary authority holder may view details about the second device. The record 1206 may indicate that the primary authority holder may view details about the third device. The record 1208 may indicate that the primary authority holder may view details about the fourth device. The record 1210 may indicate that the primary authority holder may view details about the fifth device.

The primary authority holder may send an invitation to the secondary user and/or authority holder. The invitation may comprise an invitation for administrative rights. In response to the invitation, the secondary user and/or authority holder may generate an account with administrative rights. In response to creating an account, a secondary authorized administrative user ledger 1220 may be generated. The secondary authorized administrative user ledger 1220 may comprise a record 1222 associated with the primary device, a record 1224 associated with the second device, a record 1226 associated with the third device, a record 1228 associated with the fourth device, and a record 1230 associated with the fifth device. The record 1224 may comprise a record used to authorize the second device and/or the secondary user and/or authority holder to access the platform. A secondary authorized administrative user may be able to add and revoke access for new tertiary users and/or devices.

Each device in the secondary authorized administrative user ledger 1220 for which a permission is recorded, the secondary user and/or authority holder may be able to view the device and/or details about the device via an application. The record 1222 may indicate that the secondary user may view details about the primary device. The record 1224 may indicate that the secondary user may view details about the second device. The record 1226 may indicate that the secondary user may view details about the third device. The record 1228 may indicate that the secondary user may view details about the fourth device. The record 1230 may indicate that the secondary user may view details about the fifth device.

The secondary user and/or authority holder may send an invitation to the tertiary user. The invitation may comprise an invitation for platform access. In response to the invitation, the tertiary user may generate an account. In response to creating an account, a tertiary authorized multi-device user ledger 1240 may be generated. The tertiary authorized multi-device user ledger 1240 may comprise a record 1242 associated with the third device and a record 1244 associated with the fourth device. The record 1242 may be used to authorize the third device and/or the tertiary user to access the platform.

Each device in the tertiary authorized multi-device user ledger 1240 for which a permission is recorded, the tertiary user may be able to view the device and/or details about the device via an application. The record 1242 may indicate that the tertiary user may view details about the third device. The record 1244 may indicate that the tertiary user may view details about the fourth device.

The fourth user may be associated with the account. In response to the association of the fourth user with the account, an authorized single device end-user ledger 1260 may be generated. The authorized single device end-user ledger 1260 may comprise a record 1262 associated with the fourth device. The record 1262 may be used to authorize the fourth device and/or the fourth user to access the platform. The record 1262 may indicate that the fourth user may view details about the fourth device.

A fifth user may not be authorized to access the platform. The fifth user may comprise an unauthorized device. An unauthorized fifth user ledger 1280 may be associated with the unauthorized device. The unauthorized fifth user ledger 1280 may comprise no records 1282 that permit access to the platform via the account. The record 1282 may indicate that the fifth user may not view details about any devices associated with the account of the primary authority holder.

Figure 13:
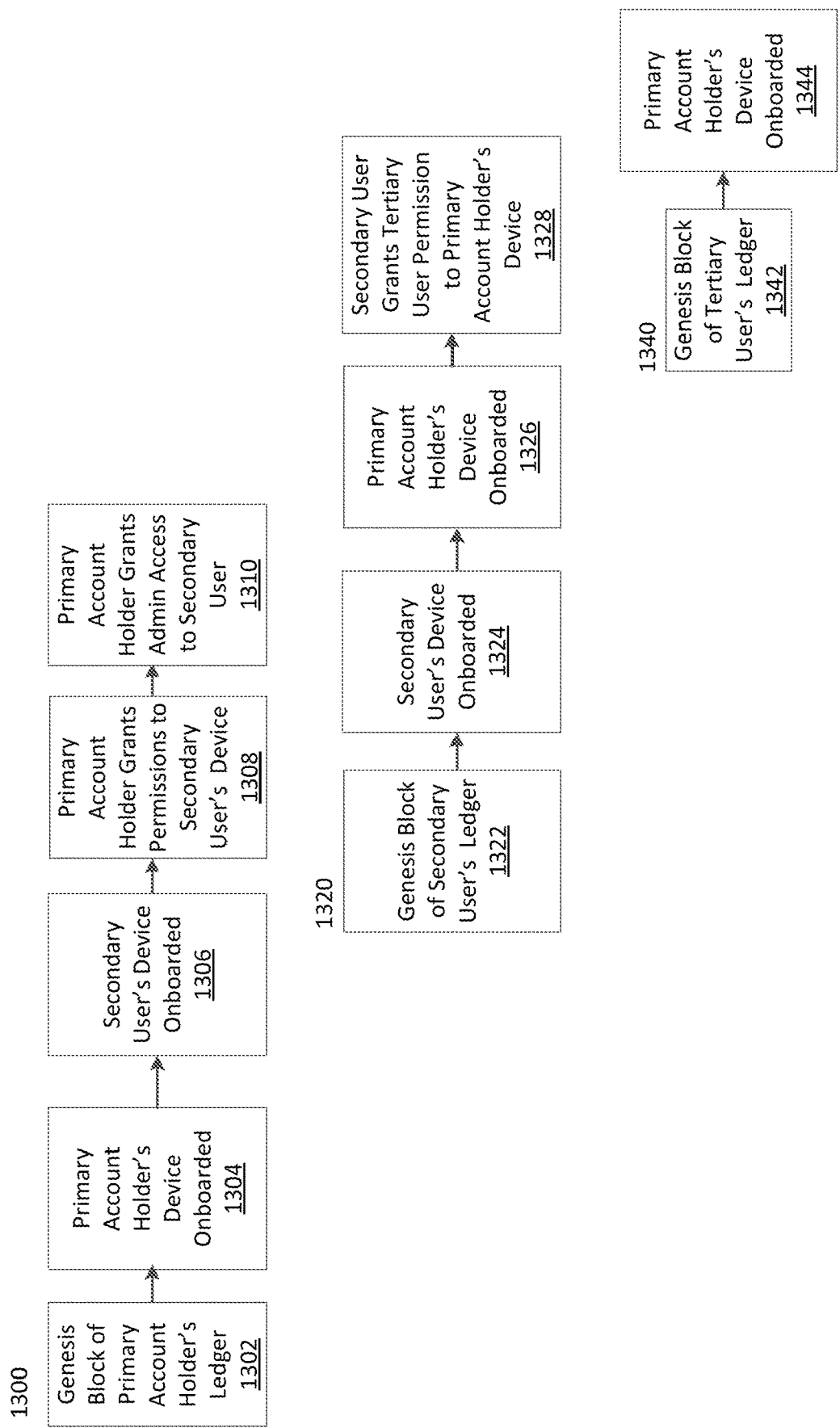
FIG. 13 shows an example method.

FIG. 13 shows an example sequence of flow diagrams 1300, 1320, 1340. A first flow diagram 1300 may correspond to a primary authority holder and/or a primary authority holder ledger. At step 1302, a primary authority holder ledger may be generated. An original record (e.g., a genesis block) may be stored on the primary authority holder's ledger. At step 1304, the first flow diagram 1300 may comprise onboarding a device of the primary authority holder. At step 1306, the first flow diagram 1300 may comprise onboarding a device of a secondary user. At step 1308, the first flow diagram 1300 may comprise the primary authority holder granting permissions to the device of the secondary user. At step 1310, the first flow diagram 1300 may comprise the primary authority holder granting administrative access to the secondary user.

A second flow diagram 1320 may correspond to a secondary user and/or a secondary authorized administrative user ledger. At step 1322, in response to the primary authority holder granting permissions to the device of the secondary user, the secondary authorized administrative user ledger and/or an original record (e.g., a genesis block) of the secondary authorized administrative user ledger may be generated. At step 1324, the second flow diagram 1320 may comprise onboarding the device of the secondary user device. At step 1326, the second flow diagram 1320 may comprise onboarding the device of the primary authority holder. At step 1328, the second flow diagram 1320 may comprise the secondary user granting a tertiary user permission to access the device of the primary authority holder.

A third flow diagram 1340 may correspond to a tertiary user and/or a tertiary authorized user ledger. At step 1340, the tertiary authorized user ledger and/or an original record (e.g., a genesis block) of the tertiary authorized user ledger may be generated. The tertiary authorized user ledger and/or an original record of the tertiary authorized user ledger may be generated in response to the secondary user and/or authority holder granting the tertiary user permission to access the device of the primary authority holder. At step 1344, the third flow diagram 1340 may comprise onboarding the device of the primary authority holder.

Figure 14:
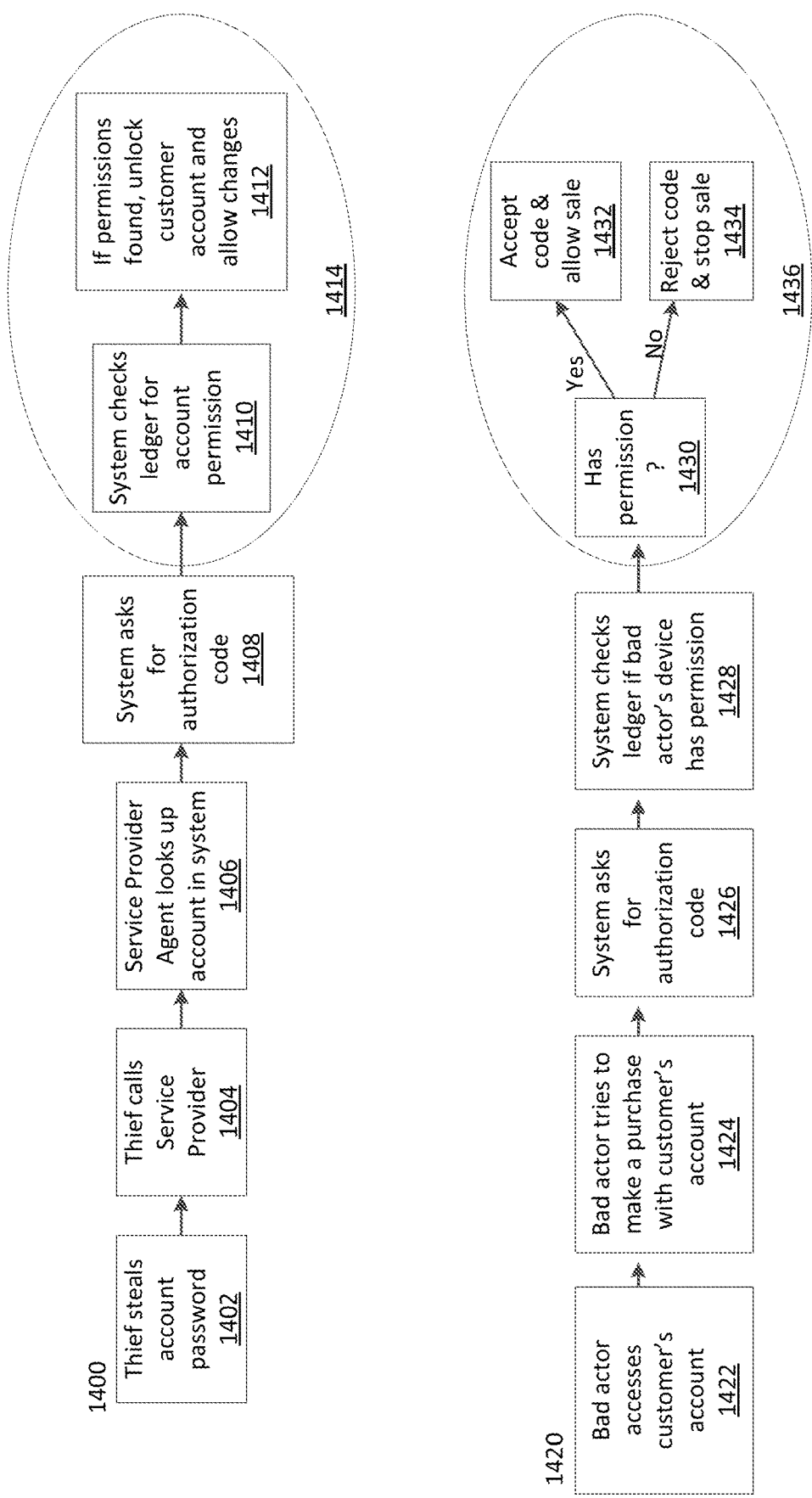
FIG. 14 shows an example method.

FIG. 14 shows example flow diagrams 1400, 1420 of fraud protection steps. Example flow diagram 1400 shows how an existing customer of a service provider may be protected from an account takeover. At step 1402, a thief may steal an account password of the existing customer. At step 1404, the thief may call the service provider. At step 1406, an agent of the service provider may look up the account in a system. At step 1408, the system may prompt the agent for an account authorization code. The agent may ask the thief for the account authorization code. The agent may input information received from the thief.

At step 1410, the system may check the inputted information against an account authorization code in a distributed ledger associated with the account. At step 1412, based on the inputted information and the account authorization code in the distributed ledger associated with the account matching, the account may be unlocked and the thief may be allowed to make account changes. Based on the inputted information and the account authorization code in the distributed ledger associated with the account not matching, the account may remained locked and the thief may not be allowed to make account changes. Steps 1410 and 1412 may comprise a portion of or all of a two-factor distributed ledger authentication method 1414.

Example flow diagram 1420 shows how an existing customer of a service provider may be protected from an unauthorized purchase. At step 1422, a bad actor may access a customer's account. At step 1424, the bad actor may try to make a purchase via the customer's account. At step 1426, a system may ask for an authorization code. At step 1428, the system may check a distributed ledger associated with the account for permissions for a device used by the bad actor.

At step 1430, a determination may be made of if the device used by the bad actor has permissions associated with the customer's account based on the check of the distributed ledger. At step 1432, it may be determined that the device that the bad actor is using has permissions associated with the customer's account (e.g., as may be the case if the bad actor steals a device of an account holder, etc.). It may be determined that the authorization code entered by the bad actor in response to the system asking for the authorization code at step 1426 may be accepted. The purchase may be allowed.

At step 1434, it may be determined that the device that the bad actor is using does not have permissions associated with the customer's account. The authorization code entered by the bad actor in response to the system asking for the authorization code at step 1426 may be rejected. The purchase may be stopped. Steps 1430, 1432, and 1434 may comprise a portion of or all of a two-factor distributed ledger authentication method 1436.

Figure 15:
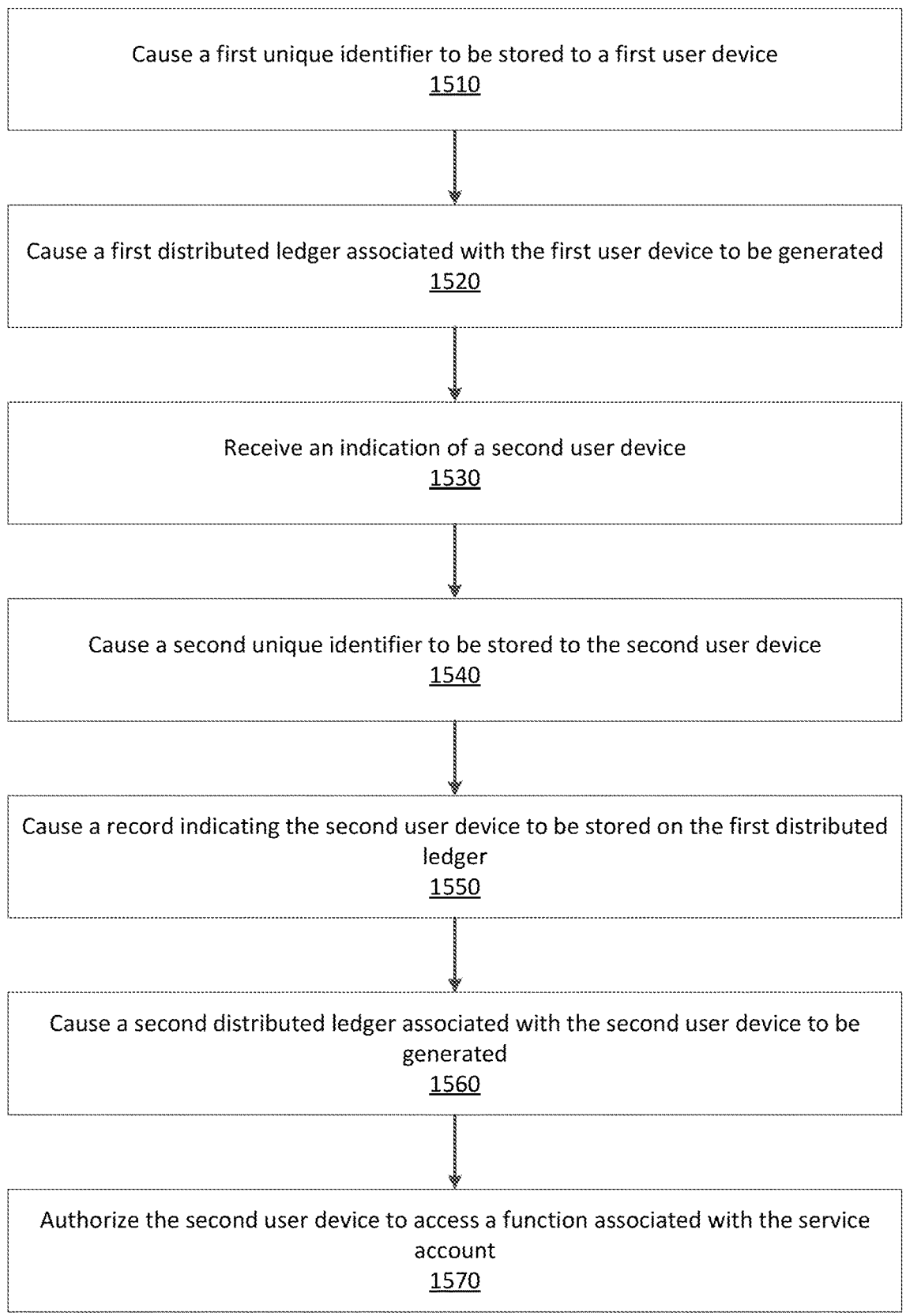
FIG. 15 shows an example method.

FIG. 15 shows an example method. At step 1510, a first unique identifier may be caused to be stored to a first user device. The first unique identifier may comprise a token. The first unique identifier may be caused to be stored on the first user device based on activation of a platform on the first user device. The first user device may be associated with a primary authority holder of a service account. The first unique identifier may be caused to be stored on the first user device based on a log in via the platform on the first user device. The unique identifier may be generated, such as based on the activation of the platform and/or the log in via the platform on the first user device.

At step 1520, a first distributed ledger associated with the first user device may be caused to be generated. The first distributed ledger associated with the first user device may be caused to be generated based on activation of the platform on the first user. The first distributed ledger may comprise a first record comprising an indication of the first unique identifier. The first record may comprise an indication of a username of a user of the first user device.

At step 1530, an indication of a second user device may be received. The second user device may be associated with the service account. The indication of the second user device may be received via the platform. A prompt to install the platform on the second user device may be sent to the second user device based on the indication of the second user device.

At step 1540, a second unique identifier may be caused to be stored on the second user device. The second unique identifier may be caused to be stored on the second user device by sending the second unique identifier to the second user device. The second unique identifier may be stored on a portion of memory of the second user device associated with the platform.

At step 1550, a record indicating the second user device may be caused to be stored and/or created on the first distributed ledger. The record may comprise an indication of a username of a user of the second user device. The record may indicate a token of the second user device. The record may indicate permissions granted to the user of the second user device, such as by the user of the first user device. The permissions may comprise authorization to access one or more functions associated with the service account.

At step 1560, a second distributed ledger associated with the second user device may be caused to be generated. The second distributed ledger may be caused to be generated based on the indication of the second user device and the unique identifier matching the first unique identifier in the first record. The second distributed ledger may comprise a third record comprising an indication of the first user device. The third record may comprise an indication of the second unique identifier. The third record may comprise an indication of the username of the user of the second user device.

At step 1570, the second user device may be authorized to access a function associated with the service account. The second user device may be authorized to access the function based on the first record, the second record, and/or the third record. The authorizing the second user device may be based on receiving a request to access the function associated with the service account. The request may comprise the second unique identifier. The authorizing the second user device may be based on determining, based on the second unique identifier, the second record and the third record.

A subscriber of a service may use a first smart phone to activate an account on a platform. In response to activation, the first smart phone may communicate with a first certifier application programming interface (API) and receive a first digital certificate from the first certifier API. In response to activation, a first distributed ledger associated with the first smart phone may be generated. The first distributed ledger may comprise a first record comprising an indication of the first digital certificate. A subscriber may send an invitation to connect to the platform to a second user with a second smart phone via an application executing on the first smart phone.

Based on the second user accepting the invitation, the second smart phone may communicate with a second certifier API and may receive a second digital certificate from the second certifier API. In response to acceptance of the invitation, a second record indicating the second digital certificate may be stored on and/or created on the first distributed ledger. In response to acceptance of the invitation, a second distributed ledger associated with the second smart phone may be generated. The second distributed ledger may comprise a third record comprising an indication of the second digital certificate and an indication of the first smart phone. The second smart phone may be authorized to use the platform to access the Internet based on the second record and the third record.

A first user may download an application associated with a service on a mobile phone. The first user may log in to the application on the mobile phone, such as by inputting a username and password. A computing device may receive an indication of the log in. Based on the log in, the computing device may generate a token. The computing device may send the token to the mobile phone. The token may be stored on the mobile phone, such as within a portion of memory associated with the application.

Based on the log in, the computing device may determine that the user is associated with a service account. The computing device may determine that a database of user information indicates that the username is associated with the service account. An existing first distributed ledger may be associated with a primary authority holder of the service account. If the first user is the primary authority holder, the computing device may initiate the first distributed ledger, such as based on the log in. The computing device may store an indication of the token and/or the username of the first user on the first distributed ledger.

The first user may input a username of a second user via the application on the mobile phone. The first user may input an indication to grant the second user permissions, such as authorization to incur expenses to the service account and authorization to add additional users to the account. The computing device may store an indication of the username and/or the privileges on the first distributed ledger.

The second user may log into a website associated with the service on a laptop computer by in putting her username and password. The computing device may receive an indication of the log in. Based on the log in, the computing device may generate a token for the laptop computer. The computing device may send the token to the laptop computer. The computing device may determine that the username of the second user is associated with the service account. The computing device may store an indication of the token and/or the username of the second user on the distributed ledger. Based on the log in, the computing device may generate a second distributed ledger associated with the second user. The computing device may store an indication of the token and/or the username of the second user on the second distributed ledger.

The second user may attempt to purchase access to content associated with the service. Based on the distributed ledger record indicating the privileges granted to the second user by the first user, the computing device may determine that the second user is authorized to purchase the access to the content. The computing device may enable the second user to incur the charge of the access to the content to the service account. The computing device may enable the second user to access the content, such as via the laptop computer.

Figure 16:
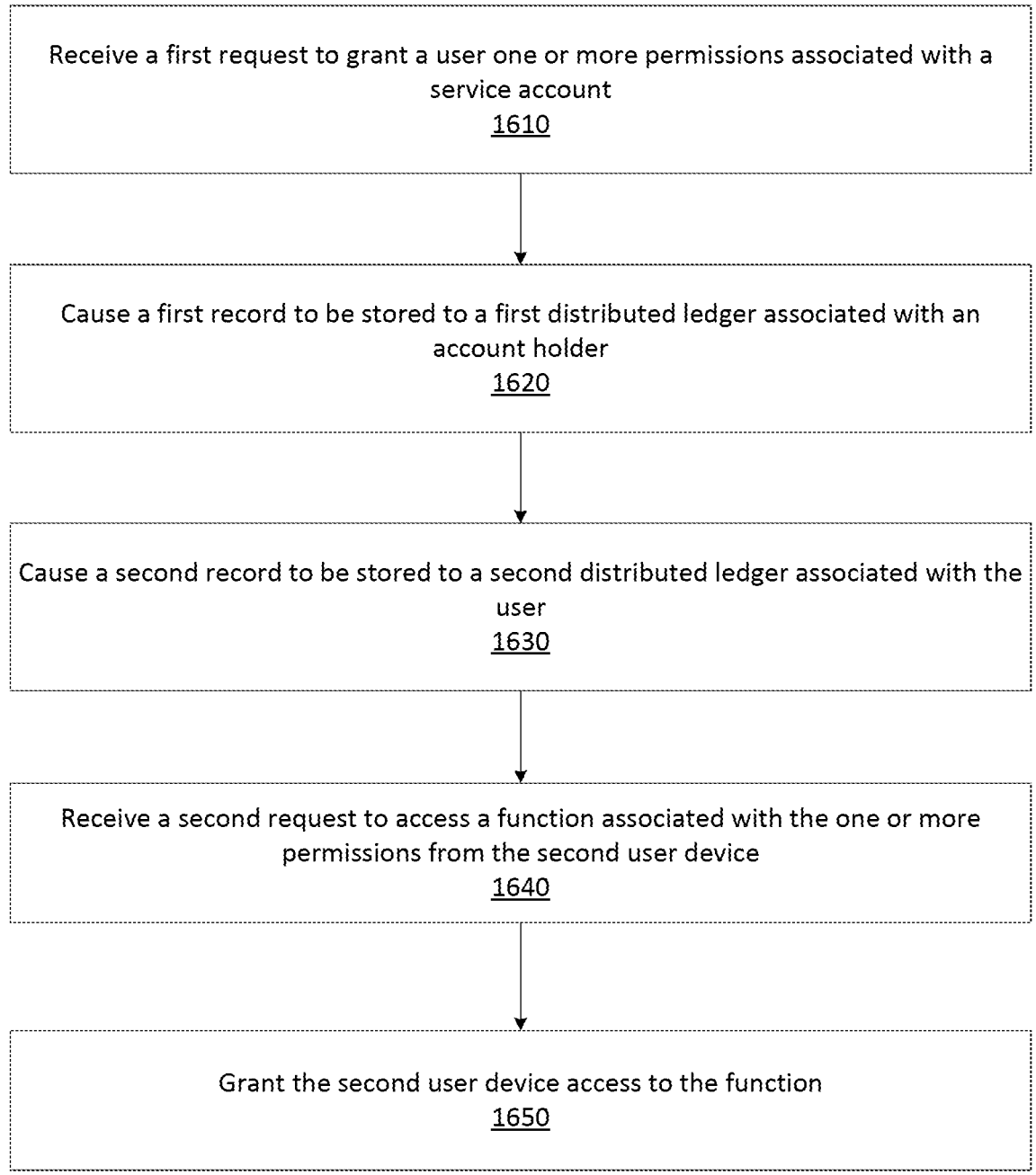
FIG. 16 shows an example method.

FIG. 16 shows an example method. At step 1610, a first request to grant a user one or more permissions associated with a service account may be received. The first request may be received from a first user device. The first user device may be associated with an account holder of the service account.

At step 1620, a first record may be caused to be stored to and/or created on a first distributed ledger associated with the account holder. The first record may be caused to be stored and/or created based on the first request. The first record may comprise an indication of a second user device associated with the user. The first record may comprise an indication of the one or more permissions. The first distributed ledger may be generated prior to the receiving the first request. The first distributed ledger may be generated based on an activation of a platform on the first user device. The first request may be received via the platform.

At step 1630, a second record may be caused to be stored to and/or created on a second distributed ledger associated with the user. The second record may be caused to be stored and/or created based on the first request. The second record may comprise an indication of the one or more permissions. The second distributed ledger may be caused to be generated based on the request. The second distributed ledger may be caused to be generated prior to the causing the second record to be stored and/or created on the second distributed ledger. The second distributed ledger may comprise an initial record on the second distributed ledger. The initial record may comprise an indication of the second user device.

A third request to grant another user a permission of the one or more permissions may be received. The third request may be received from the second user device. A third record may be caused to be stored and/or created on a third distributed ledger associated with the second user device based on the third request, the first record, and/or the second record. The third record may comprise an indication of a third user device associated with the other user.

A fourth record may be caused to be stored and/or created on the first distributed ledger based on the third request, the first record, and/or the second record. The fourth record may comprise an indication of the third user device. A fifth record may be caused to be stored and/or created on a fourth distributed ledger associated with the other user based on the third request, the first record, and/or the second record. The fifth record may comprise an indication of the permission. The second record may comprise an indication of the first user device. The second record may comprise an initial record of the second distributed ledger.

At step 1640, a second request to access a function associated with the one or more permissions may be received. The second request may be received from the second user device. The function may comprise a device replacement (warranty), access to data stored and/or created on a device, a purchase with saved payments, submission of a claim for a device, switching plans (e.g., data plan, payment plan, protection plan, etc.), access to content, and/or changing a service address (having new device sent to new address), as examples.

At step 1650, the second user device may be granted access to the function based on the second request. The second user device may be granted access to the function based on the first record and/or the second record.

A subscriber of a service may use a first smart phone to request permissions for another user. The permissions may comprise permission to access a network. The other user may comprise a second smart phone. In response to the permissions request, a first record comprising an indication of the second smart phone may be stored and/or created on a first distributed ledger. The first distributed ledger may be associated with the subscriber. In response to the permissions request, a second record comprising an indication of the permissions may be stored and/or created on a second distributed ledger. The second distributed ledger may be associated with the other user.

The second smart phone may request access to the network. In response to the request, an application may examine the first distributed ledger and the second distributed ledger. The application may allow the second smart phone to access the network based on the first record, the second record, and the request to access the network.

A first user may initiate an application associated with a service on a mobile phone. The first user may input a username of a second user and an indication to grant the second user permission to change settings of a service account. A computing device may receive the input. The computing device may receive a token from the mobile phone. Based on a username of the first user, the computing device may determine that the first user is associated with the service account. The computing device may determine that a record stored and/or created on a distributed ledger associated with a primary authority holder indicates the username of a third user and a permission granted to the third user to grant permissions associated with the service account. The computing device may determine that a record stored and/or created on a distributed ledger associated with the third user indicates the username of the first user and a permission granted to the first user to grant other users permission to change settings of the service account. The computing device may determine that a record stored and/or created on a distributed ledger associated with the first user comprises the token.

Based on one or more of the distributed ledger records, the computing device may store a record on the distributed ledger associated with the first user indicating that the second user is authorized to change settings of the service account.

The second user may log in to an application associated with the service on a set-top box, such as by inputting a username and password of the second user. Based on the log in, the computing device may generate a token associated with the set-top box. The computing device may send the token to the set-top box. The token may be stored on the set-top box. The computing device may generate a distributed ledger associated with the set-top box, such as by generating a first distributed ledger record indicating the token and the username of the second user.

The second user may select, via the set-top box, an option to restrict content available to a fourth user to child-friendly content. Based on the record on the distributed ledger associated with the first user indicating that the second user is authorized to change settings associated with the service account, the content available to the fourth user may be restricted.

FIG. 17 shows an example method. At step 1710, a request to access a function associated with a service account may be received from a user device. The request may comprise an identifier of the user device. The request may comprise a digital certificate having the identifier. The function may comprise at least one of control of a third user device associated with the account, access to data associated with the account, purchase with a payment form associated with the account, submission of a claim associated with the account, or amendment of a service associated with the account.

At step 1720, a primary authority holder of the service account may be determined. The primary authority holder may be determined based on the identifier. The primary authority holder may be authorized by a provider of a service to access functions associated with the service account. The primary authority holder may be authorized by the provider to manage permissions associated with the service account for users and/or devices. The primary authority holder may comprise a head of a household. The other users may comprise members of the household. For example, the primary authority holder may comprise a parent and the other users may comprise children. The primary authority holder may comprise an employee of an enterprise. The primary authority holder may have managerial duties. The other users may comprise other employees of the enterprise, such as employees that are managed by the primary authority holder.

At step 1730, a determination may be made that a first record on a first distributed ledger associated with the primary authority holder indicates that the user device is associated with the primary authority holder. The first record may comprise an indication of a username of the primary authority holder. The first record may comprise an indication of a unique identifier of the user device of the primary authority holder. The first record may comprise an indication the service account.

At step 1740, a determination may be made that a second record on a second distributed ledger associated with the user device indicates that the user device is associated with the primary authority holder. The first record and the second record each may comprise an indication that the user device is authorized to access the function.

At step 1750, the user device may be granted access to a function associated with the service account. The user device may be granted access to the function based on the request, the first record, and/or the second record. The function may comprise a device replacement (warranty), access to data stored on a device, a purchase with saved payments, submission of a claim for a device, switching plans (e.g., data plan, payment plan, protection plan, etc.), access to content, and/or changing a service address (having new device sent to new address), as examples.

A computing device associated with a service may receive a request from a first user of a mobile device to increase the data available to the mobile device under a service account. The request may comprise a digital certificate associated with the mobile device. Based on the digital certificate, the computing device may determine a unique identifier of the mobile device. Based on the unique identifier, the computing device may determine a first distributed ledger associated with the user. The computing device may determine a record stored and/or created on the distributed ledger indicating a second user associated with the service account.

The computing device may determine that a record stored and/or created on a second distributed ledger associated with the second user indicates that the second user granted the first user permission to change a data plan associated with the service account. The computing device may determine that a record stored and/or created on the second distributed ledger indicates a third user associated with the service account.

The computing device may determine that the third user associated with the service account is a primary authority holder of the service account. The primary authority holder may have authority of a provider of the service to grant permissions. The computing device may determine that a record stored and/or created on a third distributed ledger associated with the third user indicates that the third user granted the second user permission to grant permissions to other users.

Based on the distributed ledger records, the computing device may determine that the first user is authorized to change the data available to the mobile device. The computing device may enable the first user to modify the service account to increase the data available to the mobile device.

A user may request access to a network via an account for a platform using an application running on smart phone in communication with the platform. The application may determine a primary authority holder associated with the account based on the smart phone originating the request. The application may examine a first distributed ledger associated with the primary authority holder. A first record in the first distributed ledger may indicate that the smart phone is associated with the primary authority holder. The application may examine a second distributed ledger associated with the smart phone. A second record in the second distributed ledger may indicate that the smart phone is associated with the primary authority holder. The application may grant network access to the smart phone based on the request, the first record, and the second record.

Figure 18:
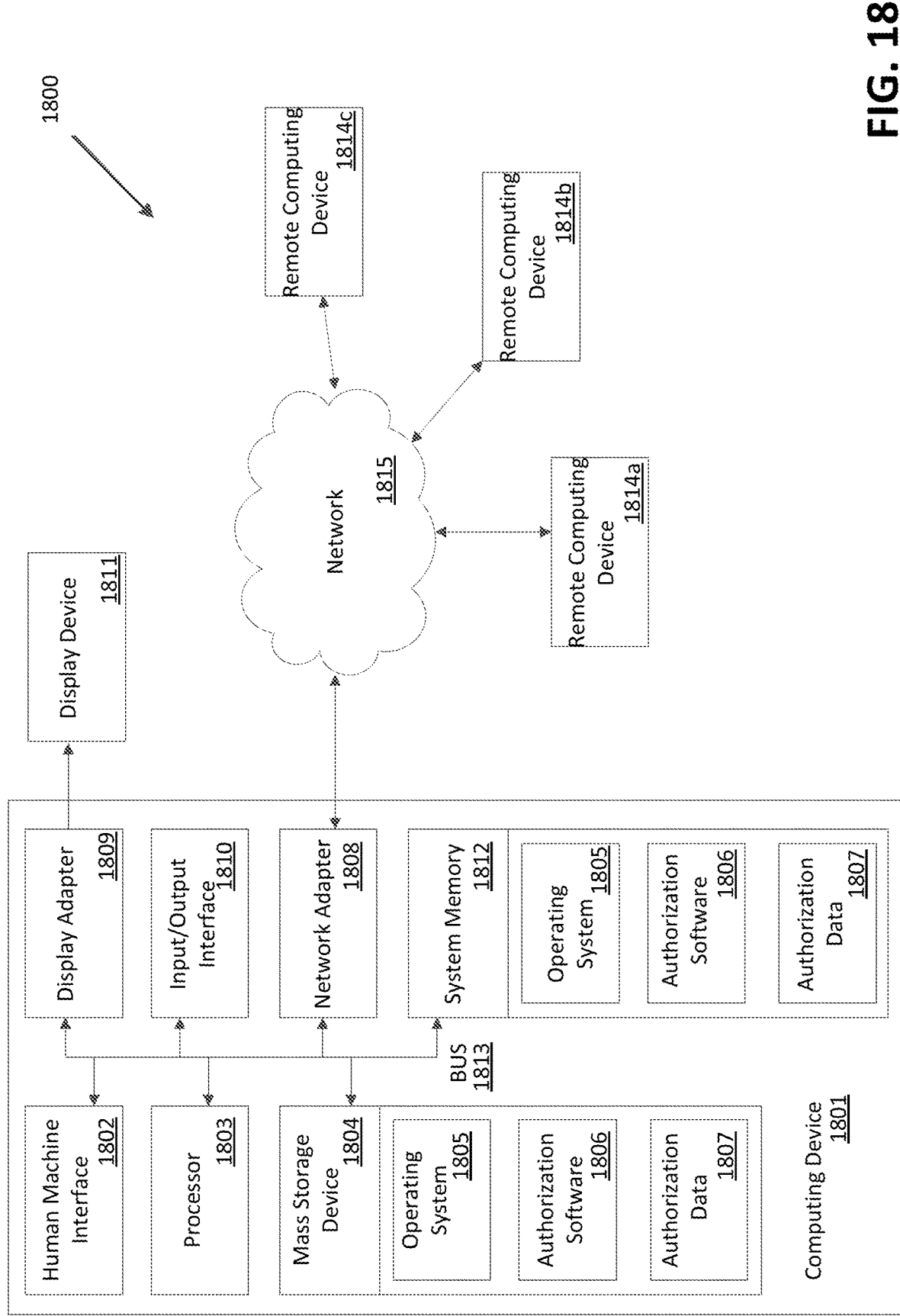
FIG. 18 shows an example computing environment.

The systems, methods, and apparatuses described herein may be implemented on a computing device such as a computing device 1801 (e.g., computer) as shown in FIG. 18 and described below. The one or more nodes 110 in FIG. 1 may be and/or comprise a computing device as shown in FIG. 18. Similarly, the methods, systems, and apparatuses disclosed may utilize one or more computing device to perform one or more functions in one or more locations.

FIG. 18 is a block diagram showing an operating environment for performing the disclosed methods, systems, and apparatuses. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 1801. The components of the computing device 1801 may comprise, but are not limited to, one or more processors 1803, a system memory 1812, and a system bus 1813 that couples various system components including the processor 1803 to the system memory 1812. With multiple processors 1803, the system may utilize parallel computing.

The system bus 1813 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1813, and all buses specified in this description may be implemented over a wired or wireless network connection and each of the subsystems, including the processor 1803, a mass storage device 1804, an operating system 1805, authorization software 1806, authorization data 1807, a network adapter 1808, system memory 1812, an Input/Output Interface 1810, a display adapter 1809, a display device 1811, and a human machine interface 1802, may be contained within one or more remote computing devices 1814a,b,c at physically separate locations, connected through buses of this form, in effect implementing a fully distributed system.

The computing device 1801 typically comprises a variety of computer readable media. Readable media may comprise any available media that is accessible by the computing device 1801 and comprises both volatile and non-volatile media, removable and non-removable media. The system memory 1812 comprises computer readable media in the form of volatile memory, such as random access memory (RAM), and/or non-volatile memory, such as read only memory (ROM). The system memory 1812 typically contains data such as authorization data 1807 and/or program modules such as operating system 1805 and authorization software 1806 that are immediately accessible to and/or are presently operated on by the processor 1803.

The computing device 1801 may comprise other removable/non-removable, volatile/non-volatile computer storage media. FIG. 18 shows a mass storage device 1804 which may provide non-volatile storage of computer code, computer readable instructions, data structures, program modules, and other data for the computing device 1801. A mass storage device 1804 may comprise a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1804, including an operating system 1805 and authorization software 1806. Each of the operating system 1805 and authorization software 1806 (or some combination thereof) may comprise elements of the programming and the authorization software 1806. Authorization data 1807 may be stored on the mass storage device 1804. Authorization data 1807 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 1801 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 1803 via a human machine interface 1802 that is coupled to the system bus 1813, but may be connected by other interface and bus structures, such as a parallel port, game port, an IEEE 1394 Port (also known as a Firewire port), a serial port, or a universal serial bus (USB).

A display device 1811 may be connected to the system bus 1813 via an interface, such as a display adapter 1809. It is contemplated that the computing device 1801 may have more than one display adapter 1809 and the computing device 1801 may have more than one display device 1811. A display device may be a monitor, an LCD (Liquid Crystal Display), or a projector. Output peripheral devices may comprise components such as speakers (not shown) and a printer (not shown) which may be connected to the computing device 1801 via Input/Output Interface 1810. Any step and/or result of the methods may be output in any form to an output device. Such output may be any form of visual representation, including, but not limited to, textual, graphical, animation, audio, tactile, and the like. The display 1811 and computing device 1801 may be part of one device, or separate devices.

The computing device 1801 may operate in a networked environment using logical connections to one or more remote computing devices 1814a,b,c. A remote computing device may be a personal computer, portable computer, smartphone, a server, a router, a network computer, a peer device or other common network node, and so on. Logical connections between the computing device 1801 and a remote computing device 1814a,b,c may be made via a network 1815, such as a local area network (LAN) and a general wide area network (WAN). Such network connections may be through a network adapter 1808. A network adapter 1808 may be implemented in both wired and wireless environments. Such networking environments are conventional and commonplace in dwellings, offices, enterprise-wide computer networks, intranets, and the Internet.

Application programs and other executable program components such as the operating system 1805 are shown herein as discrete blocks, although it is recognized that such programs and components reside at various times in different storage components of the computing device 1801, and are executed by the data processor(s) of the computer. An implementation of authorization software 1806 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A system comprising:
   a user device associated with a user; and
   a computing device configured to;
   receive a first request to grant the user one or more permissions associated with a service account;
   cause, based on the first request, a first record to be created on a first distributed ledger associated with an account holder, wherein the first record comprises an indication of the user device associated with the user;

cause, based on the first request, a second record to be created on a second distributed ledger associated with the user and different than the first distributed ledger, wherein the second record comprises an indication of the one or more permissions;

receive, from the user device, a second request to access a function associated with the one or more permissions;

access, based on the second request, the first record and the second record; and grant, based on the accessing the first record and the second record, the user device access to the function.

2. The system of claim 1, wherein the computing device is configured to cause, based on the first request and prior to the causing the second record to be created on the second distributed ledger, the second distributed ledger to be generated, wherein the second distributed ledger comprises an initial record comprising an indication of the user device.

3. The system of claim 1, wherein the computing device is further configured to:

receive, from the user device, a third request to grant a second user a permission of the one or more permissions; and cause, based on the third request, the first record, and the second record, a third record to be created on a third distributed ledger associated with the user device, wherein the third record comprises an indication of a second user device associated with the second user.

4. The system of claim 3, wherein the computing device is further configured to cause, based on the third request, the first record, and the second record, a fourth record to be created on the first distributed ledger, wherein the fourth record comprises an indication of the second user device.

5. The system of claim 4, wherein the computing device is further configured to cause, based on the third request, the first record, and the second record, a fifth record to be created on a fourth distributed ledger associated with the second user, wherein the fifth record comprises an indication of the permission.

6. The system of claim 1, wherein the first record comprises an indication of the one or more permissions.

7. The system of claim 1, wherein the first distributed ledger comprises a blockchain and the first record comprises a block of the blockchain; and wherein blocks of the blockchain each comprise no more than one transaction.

8. The system of claim 7, wherein the blocks of the blockchain each comprise an indication of a single device.

9. A non-transitory computer-readable medium storing instructions that, when executed, cause:

receiving a first request to grant a user one or more permissions associated with a service account;

causing, based on the first request, a first record to be created on a first distributed ledger associated with an account holder, wherein the first record comprises an indication of a user device associated with the user;

causing, based on the first request, a second record to be created on a second distributed ledger associated with the user and different than the first distributed ledger, wherein the second record comprises an indication of the one or more permissions;

receiving, from the user device, a second request to access a function associated with the one or more permissions; and accessing, based on the second request, the first record and the second record; and granting, based on the accessing the first record and the second record, the user device access to the function.

10. The non-transitory computer-readable medium of claim 9, wherein the instructions, when executed, further cause, based on the first request and prior to the causing the second record to be created on the second distributed ledger, the second distributed ledger to be generated, wherein the second distributed ledger comprises an initial record comprising an indication of the user device.

11. The non-transitory computer-readable medium of claim 9, wherein the instructions, when executed, further cause:

receiving, from the user device, a third request to grant a second user a permission of the one or more permissions; and causing, based on the third request, the first record, and the second record, a third record to be created on a third distributed ledger associated with the user device, wherein the third record comprises an indication of a second user device associated with the second user.

12. The non-transitory computer-readable medium of claim 11, wherein the instructions, when executed, further cause, based on the third request, the first record, and the second record, a fourth record to be created on the first distributed ledger, wherein the fourth record comprises an indication of the second user device.

13. The non-transitory computer-readable medium of claim 12, wherein the instructions, when executed, further cause, based on the third request, the first record, and the second record, a fifth record to be created on a fourth distributed ledger associated with the second user, wherein the fifth record comprises an indication of the permission.

14. The non-transitory computer-readable medium of claim 9, wherein the first record comprises an indication of the one or more permissions.

15. The non-transitory computer-readable medium of claim 9, wherein the first distributed ledger comprises a blockchain and the first record comprises a block of the blockchain; and wherein blocks of the blockchain each comprise no more than one transaction.

16. The non-transitory computer-readable medium of claim 15, wherein the blocks of the blockchain each comprise an indication of a single device.

17. A system comprising:

a user device; and a computing device configured to:

receive, from the user device, a request to access a function associated with a service account;

determine that a first record on a first distributed ledger of permissions associated with a primary authority holder of the service account indicates that the user device is associated with the primary authority holder;

determine that a second record on a second distributed ledger of permissions associated with the user device indicates that the user device is associated with the primary authority holder; and grant, based on the request, the first record, and the second record, the user device access to the function.

18. The system of claim 17, wherein the function comprises control, by the user device, of another user device associated with the primary authority holder.

19. The system of claim 17, wherein the computing device is further configured to, in response to granting the user device access to the function, cause a third record to be created on the first distributed ledger, wherein the third record comprises an indication of the granting the user device access to the function.

20. The system of claim 17, wherein the first record and the second record each comprise an indication that the user device is authorized to access the function.

21. The system of claim 17, wherein the function comprises at least one of control of a second user device associated with the service account, access to data associated with the service account, purchase with a payment form associated with the service account, submission of a claim associated with the service account, or amendment of a service associated with the service account.

22. The system of claim 17, wherein the user device is a first user device, and wherein the computing device is further configured to:
   receive, from a second user device, a second request to access the function;
   determine that a third record on the first distributed ledger of permissions associated with the primary authority holder of the service account indicates that the second user device is associated with the primary authority holder;
   determine that a fourth record on a third distributed ledger of permissions associated with the second user device indicates that the second user device is associated with the primary authority holder; and
   grant, based on the second request, the third record, and the fourth record, the second user device access to the function.

23. A non-transitory computer-readable medium storing instructions that, when executed, cause:
   receiving, from a user device, a request to access a function associated with a service account;
   determining that a first record on a first distributed ledger of permissions associated with a primary authority holder of the service account indicates that the user device is associated with the primary authority holder;
   determining that a second record on a second distributed ledger of permissions associated with the user device indicates that the user device is associated with the primary authority holder; and
   granting, based on the request, the first record, and the second record, the user device access to the function.

24. The non-transitory computer-readable medium of claim 23, wherein the function comprises control, by the user device, of another user device associated with the primary authority holder.

25. The non-transitory computer-readable medium of claim 23, wherein the instructions, when executed further cause, in response to granting the user device access to the function, a third record to be created on the first distributed ledger, wherein the third record comprises an indication of the granting the user device access to the function.

26. The non-transitory computer-readable medium of claim 23, wherein the first record and the second record each comprise an indication that the user device is authorized to access the function.

27. The non-transitory computer-readable medium of claim 23, wherein the function comprises at least one of control of a second user device associated with the service account, access to data associated with the service account, purchase with a payment form associated with the service account, submission of a claim associated with the service account, or amendment of a service associated with the service account.

28. The non-transitory computer-readable medium of claim 23, wherein the user device is a first user device, and wherein the instructions, when executed, further cause:
   receiving, from a second user device, a second request to access the function;
   determining that a third record on the first distributed ledger of permissions associated with the primary authority holder of the service account indicates that the second user device is associated with the primary authority holder;
   determining that a fourth record on a third distributed ledger of permissions associated with the second user device indicates that the second user device is associated with the primary authority holder; and
   granting, based on the second request, the third record, and the fourth record, the second user device access to the function.

* * * * *